(12) United States Patent
Luk et al.

(10) Patent No.: US 10,154,567 B2
(45) Date of Patent: Dec. 11, 2018

(54) SMART LIGHTING SYSTEM AND METHOD

(71) Applicant: Yam Ho Yeung, Hong Kong (HK)

(72) Inventors: Kim Leung Luk, Hong Kong (HK);
Yam Ho Yeung, Hong Kong (HK)

(73) Assignee: Yam Ho Yeung, Hong Kong (HK)

( * ) Notice: Subject to any disclaimer, the term of this patent is extended or adjusted under 35 U.S.C. 154(b) by 0 days.

(21) Appl. No.: 16/016,648

(22) Filed: Jun. 24, 2018

(65) Prior Publication Data

US 2018/0317301 A1 Nov. 1, 2018

Related U.S. Application Data

(63) Continuation of application No. 15/648,470, filed on Jul. 13, 2017, now Pat. No. 10,028,356, which is a continuation of application No. PCT/CN2017/090949, filed on Jun. 29, 2017.

(60) Provisional application No. 62/361,507, filed on Jul. 13, 2016.

(51) Int. Cl.
| | |
|---|---|
| *H05B 37/02* | (2006.01) |
| *F21S 9/02* | (2006.01) |
| *F21V 21/15* | (2006.01) |
| *A42B 3/04* | (2006.01) |
| *B62J 6/02* | (2006.01) |
| *B62J 6/00* | (2006.01) |
| *B62J 99/00* | (2009.01) |

(52) U.S. Cl.
CPC ....... *H05B 37/0227* (2013.01); *A42B 3/0433* (2013.01); *B62J 6/005* (2013.01); *B62J 6/02* (2013.01); *F21S 9/02* (2013.01); *F21V 21/15* (2013.01); *H05B 37/0272* (2013.01); *B62J 2006/006* (2013.01); *B62J 2006/008* (2013.01); *B62J 2099/002* (2013.01); *B62J 2099/0026* (2013.01)

(58) Field of Classification Search
CPC ............ H05B 33/0872; H05B 33/0854; H05B 37/02; H05B 37/0227; H05B 37/0272; B62J 6/02; B62J 6/04; B62J 6/005; B62J 6/20; B62J 2006/006; B62J 2006/008; B62J 2099/0026; B62J 2099/002; F21V 21/15; F21S 9/02; A42B 3/0433
See application file for complete search history.

(56) References Cited

U.S. PATENT DOCUMENTS

| | | | | |
|---|---|---|---|---|
| 7,221,263 B2 * | 5/2007 | Moore | ................. | A42B 3/0453 340/427 |
| 8,132,700 B2 * | 3/2012 | Dacko | ..................... | B62J 11/00 224/420 |
| 8,783,919 B2 * | 7/2014 | Smith | ..................... | B60Q 1/18 362/184 |

(Continued)

*Primary Examiner* — Haissa Philogene

(57) ABSTRACT

A smart lighting system for a vehicle is described. The smart lighting system includes at least one signal generator, and a lighting stem assembly. The lighting stem assembly further includes a signal receiver; a light control PCB module, and at least one light source. The at least one light source may be a rotatable lighting source, and the left indicator light and the right indictor light. Upon receiving signal by the signal receiver from a signal generator, the light control PCB module controls the operation of the rotatable lighting source, and the left indicator light and the right indictor light. The signal generator may generate the signal based on detection of gesture by a motion sensor mounted on a helmet of a rider.

20 Claims, 43 Drawing Sheets

(56) References Cited

U.S. PATENT DOCUMENTS

| | | | |
|---|---|---|---|
| 8,838,308 B2* | 9/2014 | Meyers | B62J 17/00 |
| | | | 174/53 |
| 10,028,356 B2* | 7/2018 | Luk | H05B 37/0227 |
| 2012/0242471 A1* | 9/2012 | Tsai | B62J 6/005 |
| | | | 340/432 |
| 2012/0306384 A1* | 12/2012 | Chen | H05B 33/0854 |
| | | | 315/159 |
| 2017/0135177 A1* | 5/2017 | Wang | H05B 37/0227 |
| 2017/0267162 A1* | 9/2017 | Remillard | B60Q 1/0023 |

\* cited by examiner

SMART LIGHTING SYSTEM AND METHOD

CROSS-REFERENCE TO RELATED APPLICATIONS

The present application is a Continuation Application of U.S. patent application Ser. No. 15/648,470 filed on Jul. 13, 2017, which is a Continuation Application of PCT Application No. PCT/CN2017/090949 filed on Jun. 29, 2017, which claims the benefit of Provisional Application No. 62/361,507, filed on Jul. 13, 2016. All the above are hereby incorporated by reference.

TECHNICAL FIELD OF THE INVENTION

The present patent application pertains generally to a smart lighting system, and specifically to a smart lighting system for a two-wheeled vehicle like a bicycle.

BACKGROUND

Over the recent times, there has been a substantial increase in the adoption and use of bicycles for various purposes varying from being a mode of commutation to mode of recreation. However, unlike the other vehicles like cars and motorcycles, the safety of the rider of the bicycles is compromised, mainly due to the challenges in providing an effective lighting system. The lack of proper lighting system compromises the safety of the riders due to two reasons. Firstly, the rider of the bicycle is unable to see clearly the path and any approaching vehicle traffic and animals on the roads. Secondly, the bicycle and the rider of the bicycle may not be clearly observable to the users of the other vehicles on the roads, thereby making the bicycle and the rider of the bicycle susceptible to collisions with other vehicles thereby causing accidents. It has been seen that the lack of proper lighting in the bicycles is the major cause of bicycle-related accidents in the dark.

Bicycles may be provided with certain lighting solutions which may be powered by a battery carried on the bicycle or by dynamo generating electricity using the kinetic energy of the moving bicycle. However, generally such arrangements involve extensive electrical wiring. Such wiring may pose problems for the rider of the bicycle during riding the bicycle. Further, such wiring could also badly affect the aesthetic appeal of the bicycle.

Therefore, an improved lighting solution is desired for bicycles that can afford safety to the rider of bicycles as well as help in preventing bicycle-related accidents.

SUMMARY

The present subject matter describes a smart lighting system for two-wheeled vehicles, such as bicycles. The smart lighting system includes at least one signal generator and a lighting assembly. The lighting assembly further includes a signal receiver, a light control module, and at least one light source, such that the signal receiver receives a signal generated by the at least one signal generator. In response to the signal received by the signal receiver, the light control module controls the at least one light source. The lighting assembly is mounted on a vehicle, the vehicle being two-wheeler like a bicycle. The at least one signal generator may be a motion sensor, such that the motion sensor is mounted on a helmet of a rider of the bicycle. Further the signal generator may be a remote control device or smart phone. The lighting assembly may further include a rotor and a rotatable lighting source adapted to be rotated by the rotor, such that in response to the signal received by the signal receiver, the light control module causes the rotor to rotate to change the orientation of the rotatable lighting source. The rotor may be powered by an electric motor. The lighting assembly may further include a left indicator light and a right indicator light, such that each of the left indicator light and the right indicator light is adapted to project light on the ground. The light control module causes each of the left indicator light and the right indicator light to project light on the ground in response to signal received by the signal receiver. The lighting assembly may also include a display screen configured to display information about one of the parameters including speed, slope, time, battery status. The lighting assembly may include a power socket for supplying electricity for charging various electrical devices. The lighting assembly may include a battery, such that the battery is configured to supply electricity to the electric motor, the rotatable light source, the left indicator light and the right indicator light, and the power socket. A braking sensor communicating to the brakes of the vehicle may also be provided.

The present subject matter further describes a method of controlling lighting of a vehicle. The method includes receiving signal by a light control module, from at least one signal source, and in response to the signal received, controlling, by the light control module, at least one of rotatable light source, a left indicator light, and a right indicator light. The method of controlling the at least one rotatable light source includes receiving, by the light control module, signal generated by the signal source, and in response to the signal received, controlling a rotor, such that the rotor is connected to the rotatable lighting source, and the light control module causes the rotor to rotate to thereby change the orientation of the rotatable lighting source. The method of controlling the left indicator light and the right indicator light includes receiving, by the light control module, signal generated by the signal generator, and in response to the signal received, the light control module causes each of the left indicator light and the right indicator light to project light on the ground.

DETAILED DESCRIPTION

Figure 1:
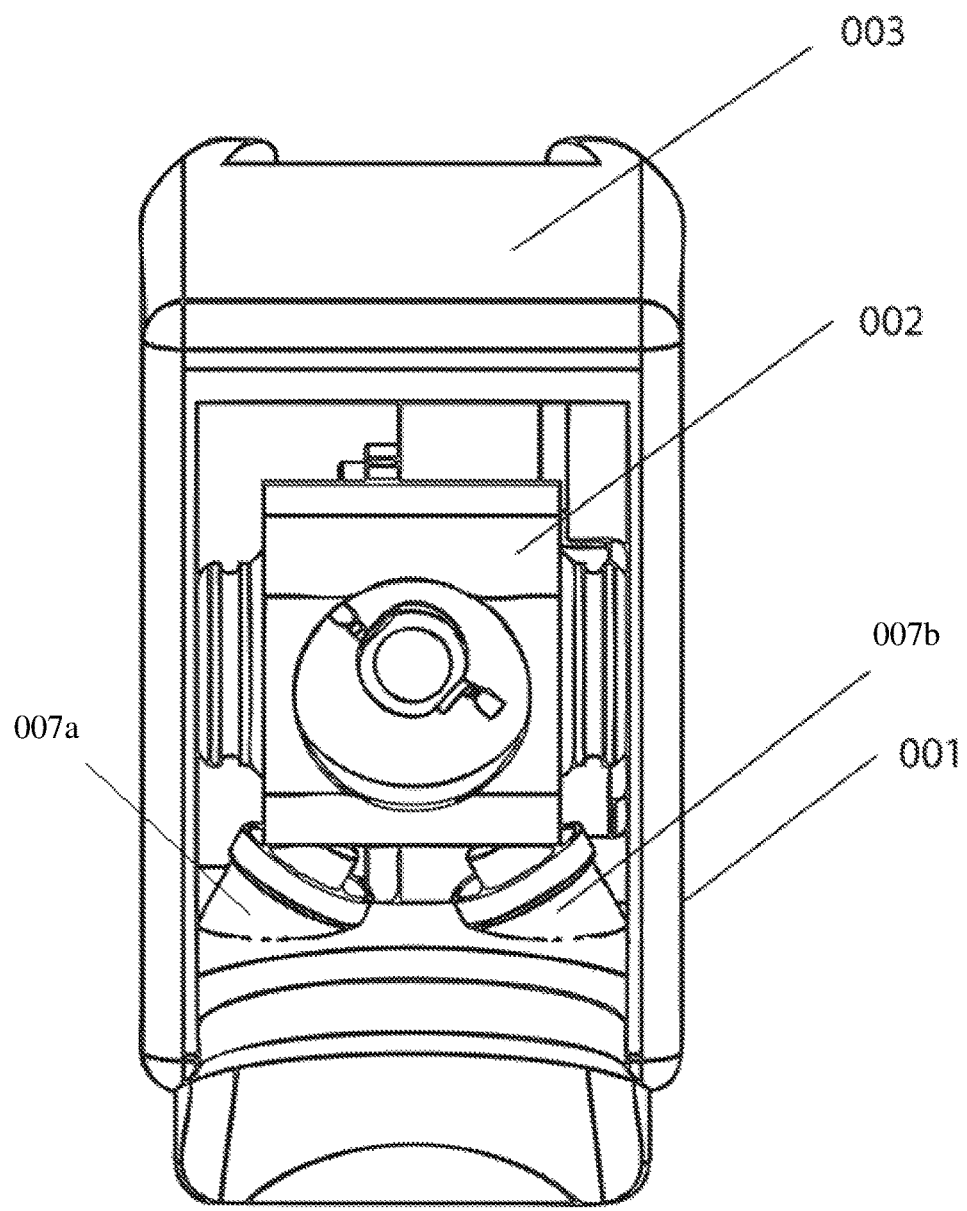
FIG. 1 shows a top view of the lighting stem assembly, as one embodiment of the subject matter.

A smart lighting system, particularly for two-wheeled vehicle like bicycles, is described. The smart lighting system includes a lighting assembly which further includes at least one light source. The lighting assembly is mounted on the bicycle. The lighting assembly is preferably mounted at the front end of the bicycle preferably on the handle of the bicycle.

The lighting assembly of the smart lighting system communicates with a signal generator to receive signals to control the lighting produced by the lighting assembly. In one embodiment, the signal generator is a motion senor mounted on a helmet of a rider riding the bicycle. The rider of the bicycle may control the lighting provided by the lighting assembly by performing certain gestures by his head. The motion sensor mounted on the head of the rider detects the gesture performed and based on the gesture a signal is generated to further effect a change in the direction of the projection of the lighting produced by the lighting assembly.

The lighting assembly includes a rotatable lighting source provided with a rotor. The rotor is driven by an electric motor. Based on the signal received from the signal generator, the rotor rotates the rotating lighting source to thereby change the orientation of the rotating lighting source. For example, the motion sensor may detect the gesture of head of the rider moving up and down. Based on the movement of the head, the motion sensor generates a signal to cause the movement of the rotatable light source to an extent and speed corresponding to the movement of the head of the rider so that the light beam projection is always in line with the direction in which eyes of the rider are pointing.

The lighting assembly further includes a left indicator light and a right indictor light. The left indicator light and the right indictor light are activated to project light on the left and right side of the bicycle based on which side the bicycle is turning. The motion sensor may detect the gesture of head of the rider moving sideways to the left or the right side. Based on the movement of the head, the motion sensor generates a signal to cause activation of either the left indicator light or the right indicator light.

The rotatable lighting source, the left indicator light and the right indictor light may communicate with the motion sensor through wireless means such as Bluetooth and Wi-Fi.

The lighting assembly of the smart lighting system is mounted on a front end of the bicycle. Further, the smart lighting system includes a signal receiver. The signal receiver receives signals through Bluetooth or Wi-Fi from a signal generator. The signal generator may be provided on the helmet of the rider of the bicycle. The helmet further includes a motion sensor. The signal generator communicates with the motion sensor, and based on the sensing of the motion sensor, generates a signal. Upon receiving the signal generated by the signal generator, the signal receiver passes the signal to the lighting assembly.

Thus, the lighting assembly includes the rotatable lighting source, and the left indicator light and the right indictor light. Based on the signal received, the rotatable light source is rotated so that light beam projection by the rotatable lighting source is always in line with the direction in which eyes of the rider are pointing.

Further, based on the signal received, the left indicator light or the right indictor light is activated to project light on the ground on the left or the right side of bicycle, thereby providing indication to the other commuters on the road about the intention of the rider of the bicycle of turning in either the left or the right direction, as well as illuminating the path for rider of the bicycle in the left or the right side.

The smart lighting system, therefore, provides the advantages of providing a convenient way of changing the orientation of the rotatable lighting source, such that the rider can change the orientation of the rotatable lighting source merely by the movement of the head. Also, the light produced by the rotatable lighting source is projected more accurately in the direction the rider is looking, thereby improving visibility for the rider in the dark, thereby reducing chances of accidents. Further, the smart lighting system provides for easy and convenient way of giving indication by activating the left indicator light and the right indicator light merely by movement of the head of the rider. Further, by projecting the light of the left indicator light and the right indicator light on the ground, the smart lighting system improves visibility of the rider of the bicycle on the left and right sides, as well as makes the rider as well as the bicycle more observable on the road, thereby reducing chances of accidents.

FIG. 1 depicts a top view of the lighting stem assembly 001. As it can be seen, the lighting stem assembly 001 includes a rotatable lighting source 002. The lighting stem assembly 001 further includes the left indicator light 007a and the right indictor light 007b. The lighting stem assembly 001 also includes a control panel 003.

In an embodiment, the rotatable lighting source 002 is provided on the front end of the lighting stem assembly 001, such that upon the activation of the rotatable lighting source 002, the light produced by the rotatable lighting source 002 is projected ahead of the rider riding the bicycle. As mentioned earlier, the rotatable lighting source 002 is rotatable to change the orientation of the light produced by the rotatable lighting source 002. For example, the rotatable lighting source 002 is oriented downwards to project light and illuminate the region nearer to the bicycle. The rotatable lighting source 002 may be oriented to upwards to project light and illuminate region farther away from the bicycle.

The left indicator light 007a and the right indictor light 007b are provided along the two longitudinal sides of the lighting stem assembly 001. The left indicator light 007a and the right indictor light 007b are provided at the bottom of the lighting stem assembly 001, so that when activated, the light produced by the left indicator light 007a and the right indictor light 007b is projected on the road.

The lighting stem assembly 001 further includes a control panel 003. The control panel 003 is provided on the top of the lighting stem assembly 001. The control panel may include a display screen to provide information about the various parameters associated with the bicycle, such as speed, slope, time, battery status. Further, the control panel may include control switches for controlling the various components.

Figure 2:
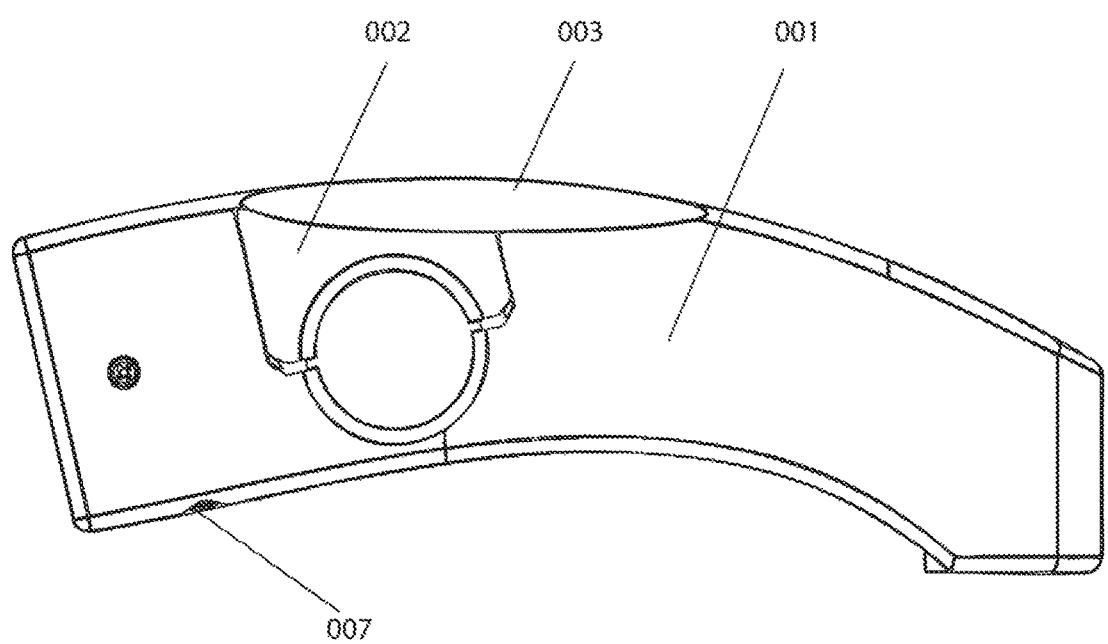
FIG. 2 depicts a right side view of the lighting stem assembly, as another embodiment of the subject matter.

FIG. 2 depicts a right-side view of the lighting stem assembly 001. As it can be seen in FIG. 2, the lighting stem assembly 001 includes the rotatable lighting source 002 provided on the front end of the lighting stem assembly 001, the left and right indicator lights 007 provided at the bottom of the lighting stem assembly 001, and the control panel 003 provided on the top of the lighting stem assembly 001.

Figure 3:
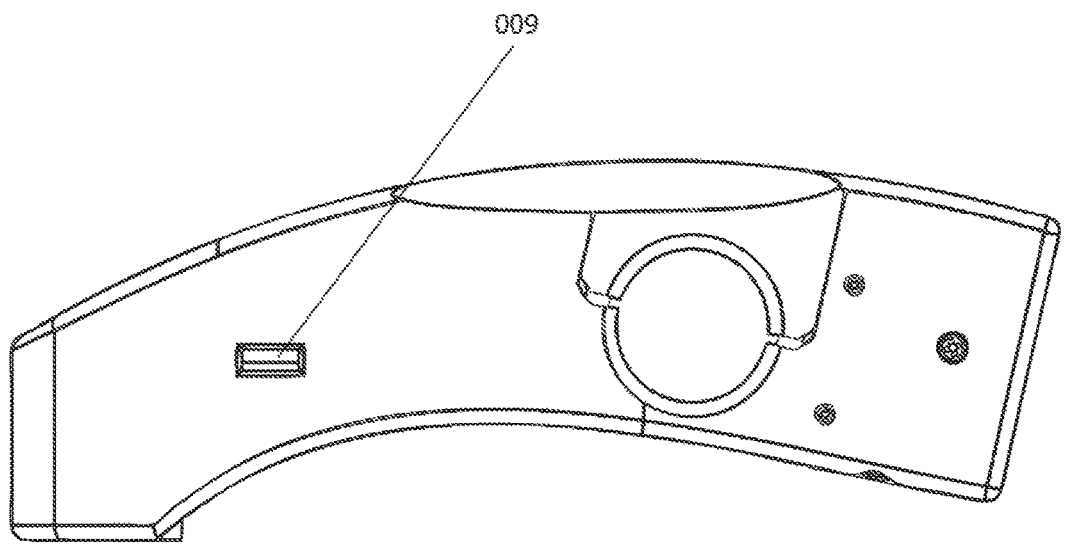
FIG. 3 depicts a left side view of the lighting stem assembly, as another embodiment of the subject matter.

FIG. 3 depicts a left side view of the lighting stem assembly 001. As it can be seen in FIG. 2, the lighting stem assembly 001 includes a power socket 009. The power socket 009 can be used for powering and charging various electronic devices, such as mobile phones. In an embodiment, the power socket 009 is a USB port. The power socket 009 can be provided at any suitable location on the lighting stem assembly 001. For example, the power socket 009 can be provided on one of the longitudinal vertical surface of the lighting stem assembly 001, as shown in the FIG. 3.

Figure 4:
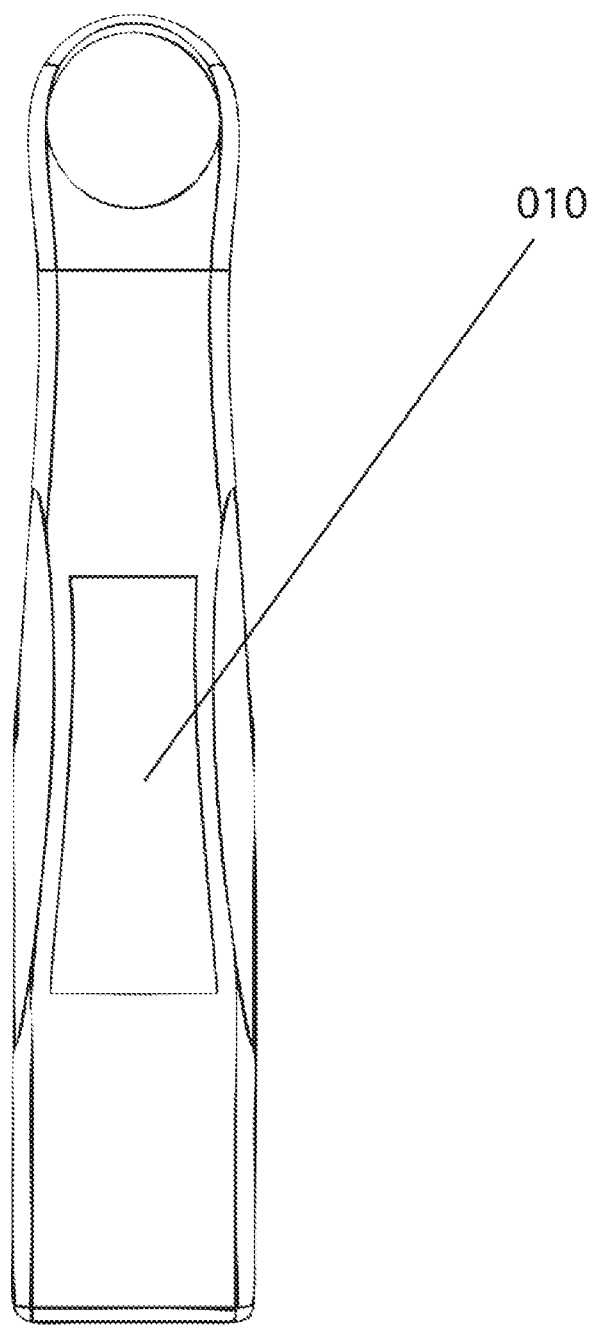
FIG. 4 shows a top view of the lighting stem assembly, as one embodiment of the subject matter.

FIG. 4 shows a top view of the lighting stem assembly 001. The FIG. 4 shows a display screen 010 of the control panel of the lighting stem assembly 001. As mentioned earlier, the control panel includes the display screen 010 to display information about the various parameters associated with the bicycle, such as speed, slope, time, battery status. The display screen 010 is provided on the top surface of the lighting stem assembly 001 for easy viewing and accessing by the rider of the bicycle. In an embodiment, the display screen 010 is a touch-enabled screen.

Figure 5:
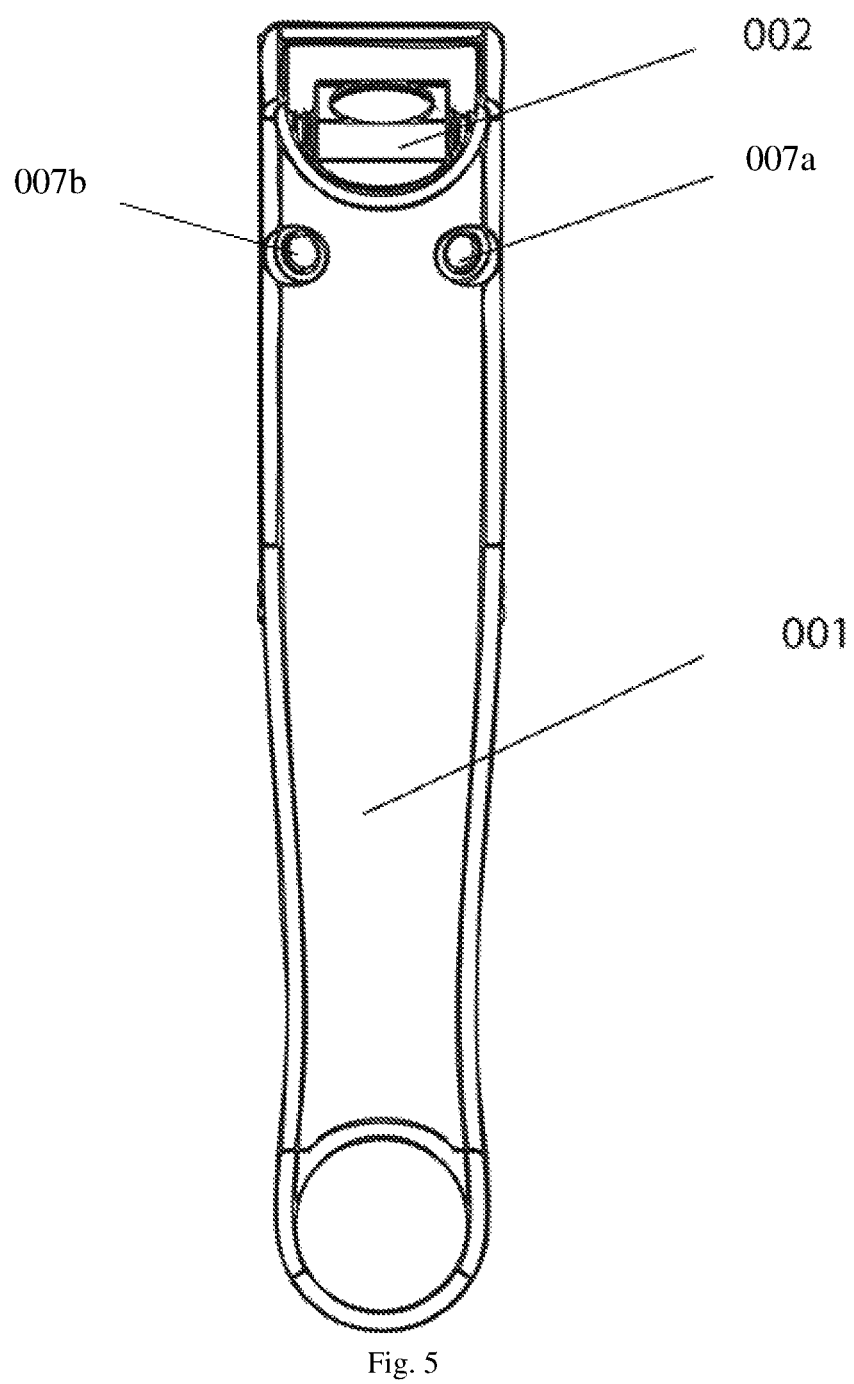
FIG. 5 shows a bottom view of the lighting stem assembly, as one embodiment of the subject matter.

FIG. 5 shows a bottom view of the lighting stem assembly 001. It can be seen that the rotatable lighting source 002 is provided on the front end of the lighting stem assembly 001, such that upon activation of the rotatable lighting source 002, the light produced by the rotatable lighting source 002 is projected ahead of the rider riding the bicycle. Further, the lighting stem assembly 001 includes a window which allows the rotatable lighting source 002 to rotate so that the orientation of the rotatable lighting source 002 and the light produced by the rotatable lighting source 002 can be changed.

Further, FIG. 5 shows the left indicator light 007a and the right indictor light 007b provided along the two longitudinal sides of the lighting stem assembly 001 at the bottom of the lighting stem assembly 001. Upon activation, the light produced by the left indicator light 007a and the right indictor light 007b is projected on the road.

Figure 6:
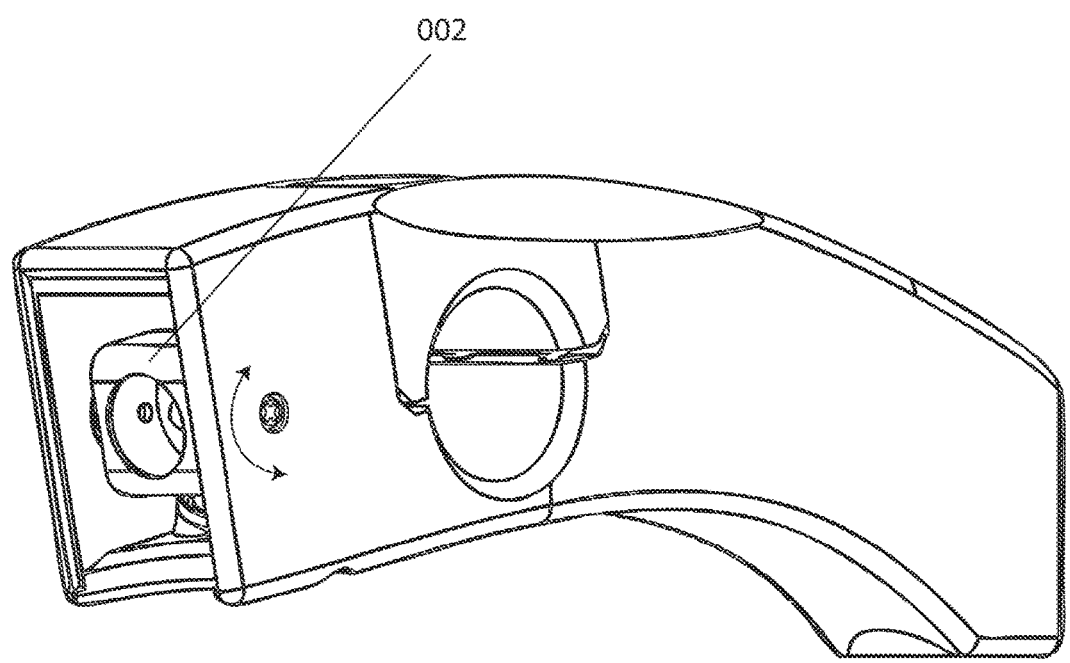
FIG. 6 shows a perspective view of the lighting stem assembly, as another embodiment of the subject matter.

FIG. 6 shows a perspective view of the lighting stem assembly 001. It can be seen that the rotatable lighting source 002 is provided on the front end of the lighting stem assembly 001. Further, the lighting stem assembly 001 includes a window out of which the rotatable lighting source 002 heads out. The window is kept large in size to allow rotation of the rotatable lighting source 002 so that the orientation of the rotatable lighting source 002 and the light produced by the rotatable lighting source 002 can be changed. Upon activation of the rotatable lighting source 002, the light produced by the rotatable lighting source 002 is projected ahead of the rider riding the bicycle. The rotatable lighting source 002 may rotate about a horizontal axis, as shown in the FIG. 6. Further, FIG. 6 shows the rotatable lighting source 002 oriented more upwards along the horizontal plane. In this orientation, the rotatable lighting source 002 projects light and illuminate region farther away from the bicycle, thereby providing a long-range illumination.

Figure 7:
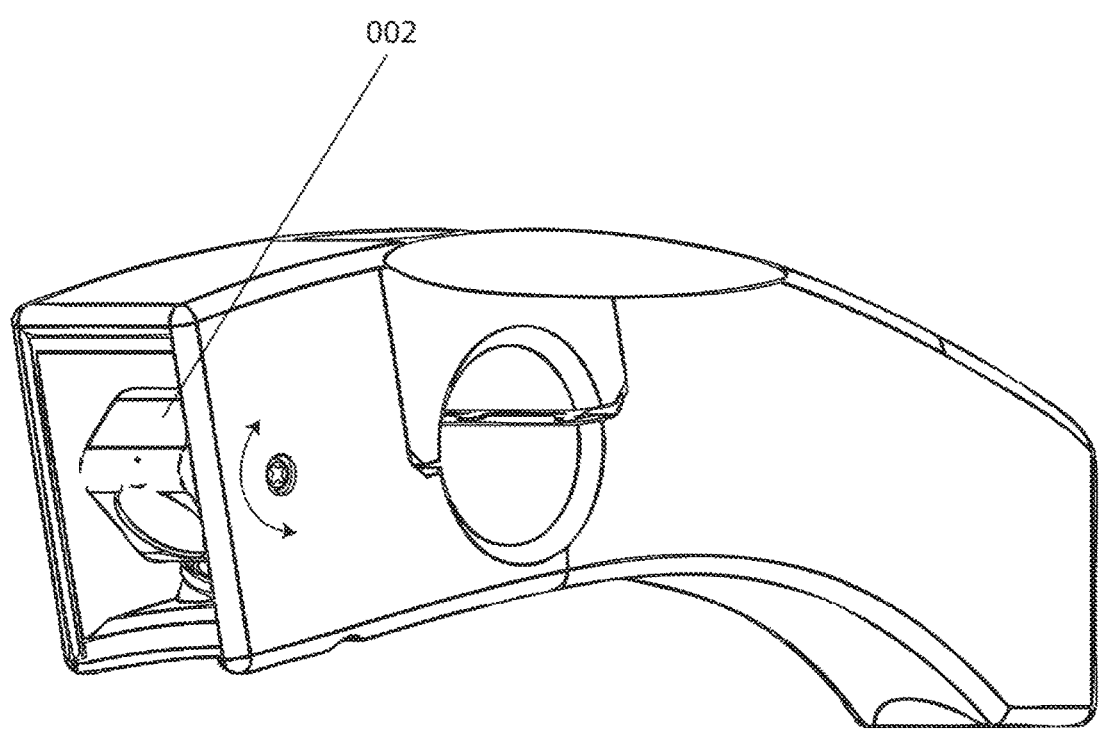
FIG. 7 shows a perspective view of the lighting stem assembly with the rotatable lighting source positioned in a different orientation, as an embodiment of the subject matter.

FIG. 7 shows a perspective view of the lighting stem assembly 001 with the rotatable lighting source 002 positioned in a different orientation. As mentioned earlier, the rotatable lighting source 002 may rotate about a horizontal axis, as shown in the FIG. 7. Further, FIG. 7 shows the rotatable lighting source 002 oriented downwards more along the vertical plane. In this orientation, the rotatable lighting source 002 projects light and illuminate region nearer to the bicycle, thereby providing a short-range illumination. Thus, as the rotatable lighting source 002 rotates clockwise, the rotatable lighting source 002 is inclined more along the horizontal plane to project light and illuminate region farther away from the bicycle. On the other hand, as the rotatable lighting source 002 rotates anti-clockwise, the rotatable lighting source 002 is inclined more along the vertical plane to project light and illuminate region nearer to the bicycle.

Figure 8:
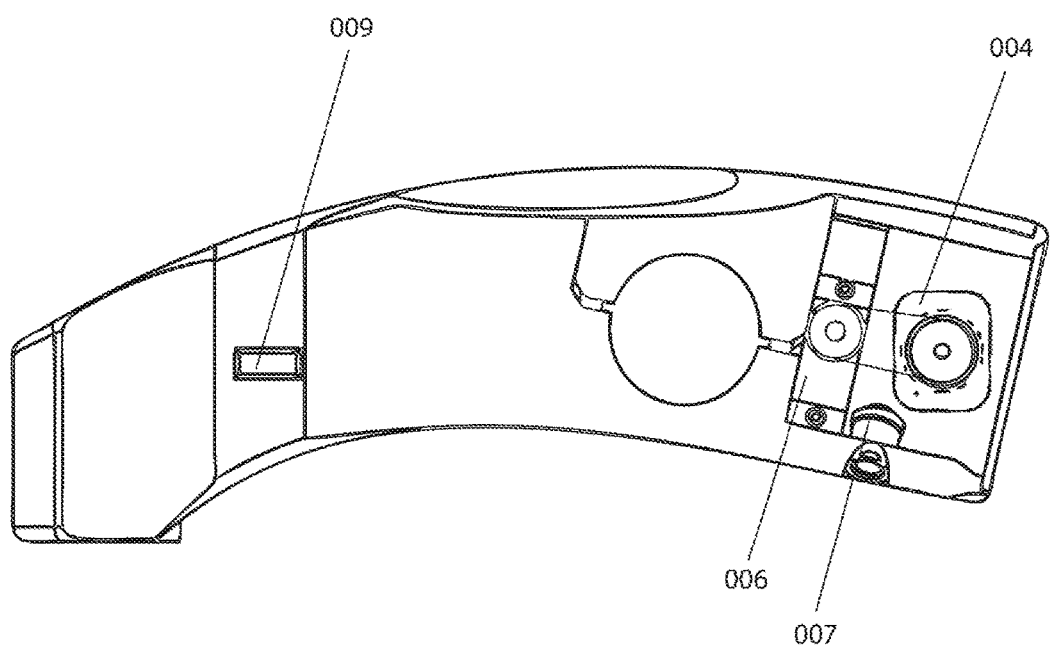
FIG. 8 shows a cross-section view of the lighting stem assembly, as an embodiment of the subject matter.

FIG. 8 shows a cross-section view of the lighting stem assembly 001. Various constituent components of the lighting stem assembly 001 can be seen in the FIG. 8. The lighting stem assembly 001 includes a rotor 004. The rotor 004 is coupled to the rotatable lighting source 002 and is responsible for causing the rotation of the rotatable lighting source 002. The rotor 004 rotates the rotatable lighting source 002 depending upon the extent of rotation the rotatable lighting source 002 is required to undergo.

FIG. 8 further shows a motor 006. The motor 006 powers the rotor 004. In an embodiment, the motor 006 is a direct current (DC) motor powered by a DC source, such as battery. The motor 006 is coupled to the rotor 004 to drive the rotor to provide rotational motion to the rotatable lighting source 002. FIG. 8 shows the rotor 004 in a first position. Further, the left and right indicator lights 007 of the lighting stem assembly 001 can be seen in the FIG. 8. Also, the FIG. 8 shows a power socket 009, such as a USB port of the lighting stem assembly 001.

Figure 9:
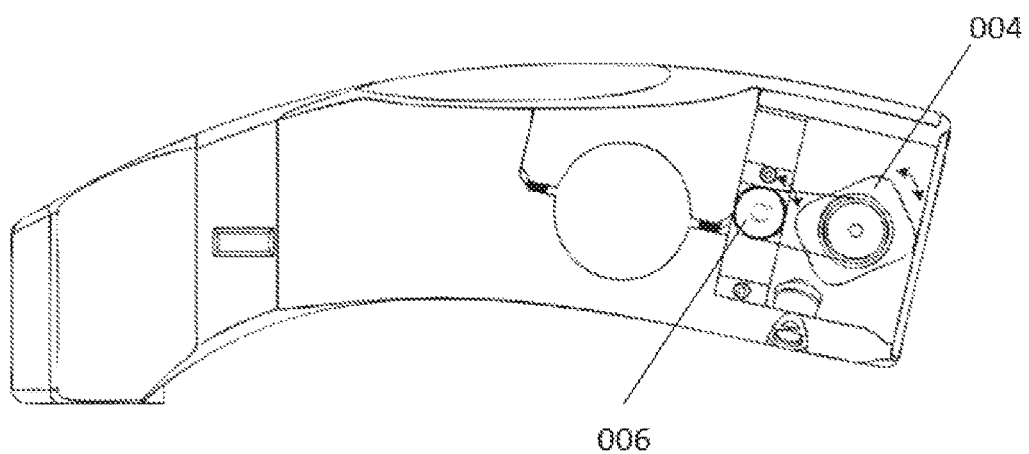
FIG. 9 shows the rotor of the lighting stem assembly in a second position after the rotor has undergone rotation, as an embodiment of the subject matter.

FIG. 9 shows the rotor 004 of the lighting stem assembly 001 in a second position after the rotor has undergone rotation. As mentioned earlier, the motor 006 powers the rotor 004 to drive the rotor 004 to further provide rotational motion to the rotatable lighting source. Depending upon the desired angle of the rotatable lighting source 002, the motor may cause the rotor 004 to rotate to a specific extent.

Figure 10:
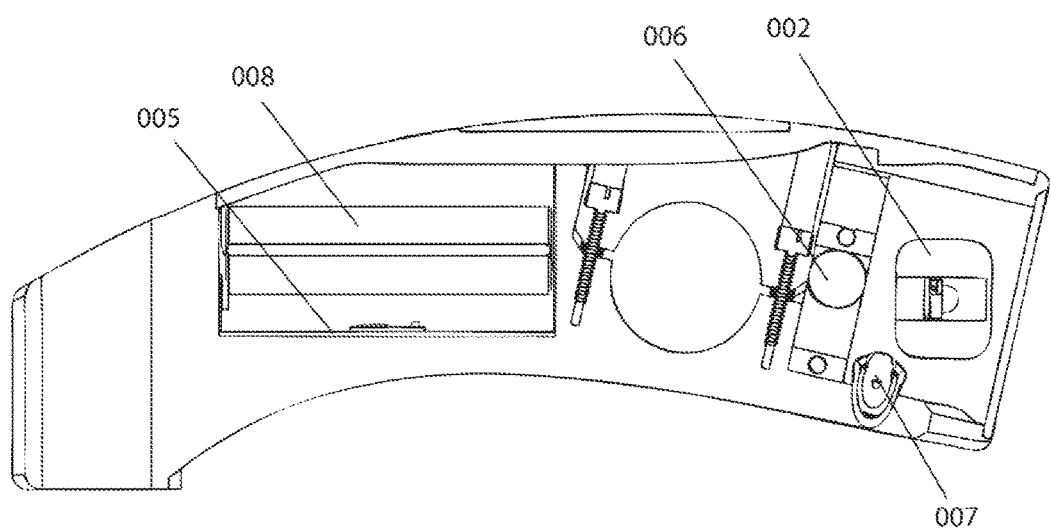
FIG. 10 shows another cross section view of the lighting stem assembly, as an embodiment of the subject matter.

FIG. 10 shows another cross section view of the lighting stem assembly 001. In the cross-section view, the rotatable lighting source 002 and the motor 006 can be seen. Further, FIG. 10 shows the left and right indicator lights 007 of the lighting stem assembly 001. Furthermore, the FIG. 10 shows a battery 008 mounted in the lighting stem assembly 001. The battery 008 is provided to power the various components, such as rotatable lighting source 002, the left indicator light 007a and the right indictor light 007b, the power socket 009, and the display screen 010. Further, the battery 008 is removable mounted in the lighting stem assembly 001, such that the battery 008 may be removed and replaced, as required.

FIG. 10 also shows a light control printed circuit board (PCB) module 005. The light control PCB module 005 further includes a processor for controlling the lighting operation of the lighting stem assembly 001. The controlling of the lighting stem assembly 001 by the light control PCB module 005 is explained later in the application.

Figure 11:
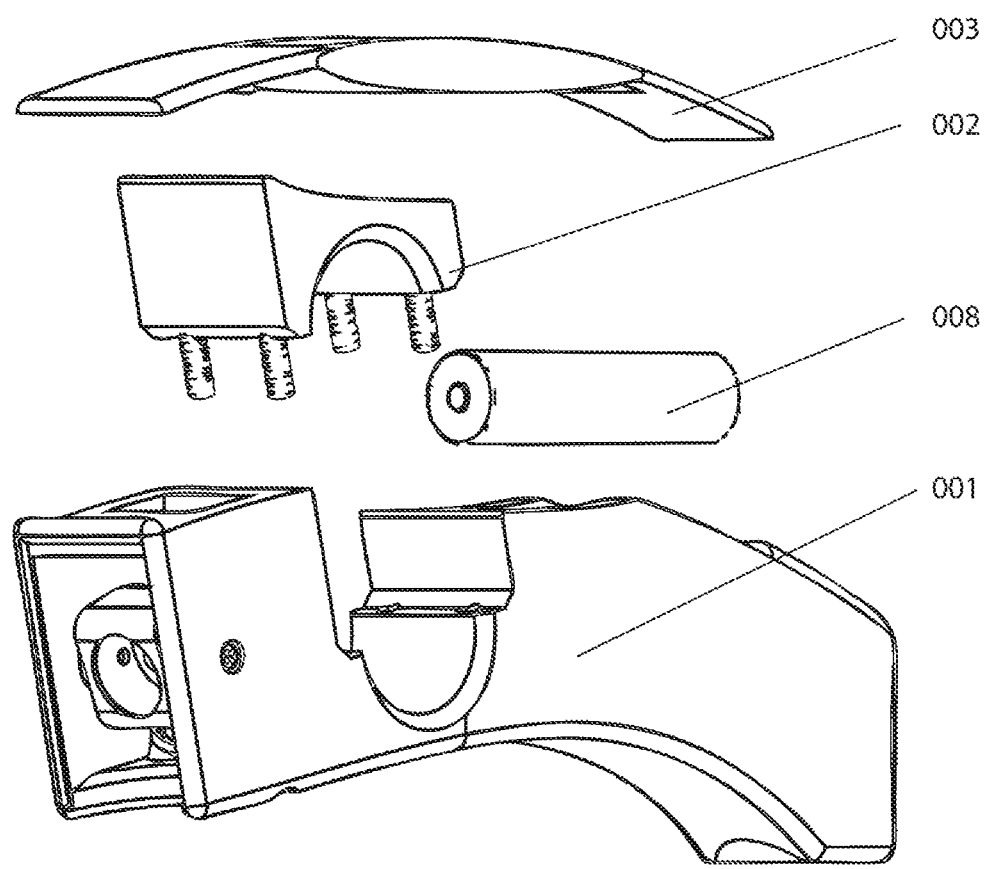
FIG. 11 shows perspective view of the lighting stem assembly, as another embodiment of the subject matter.

FIG. 11 shows a perspective view of the lighting stem assembly 001 with the removable parts of the lighting stem assembly 001 disassembled from each other. It can be seen that the battery 008 is mounted inside the lighting stem assembly 001 under the top surface of the lighting stem assembly 001. Further, the battery 008 may be removed by lifting the top surface of the lighting stem assembly 001.

Further, the rotatable lighting source 002 is fitted inside the lighting stem assembly 001, and which may be removed by unscrewing screws. Furthermore, the control panel 003 is provided on the top surface of the lighting stem assembly 001. Therefore, to access the battery 008, first, the control panel 003 may be required to disassembled and separated.

Figure 12:
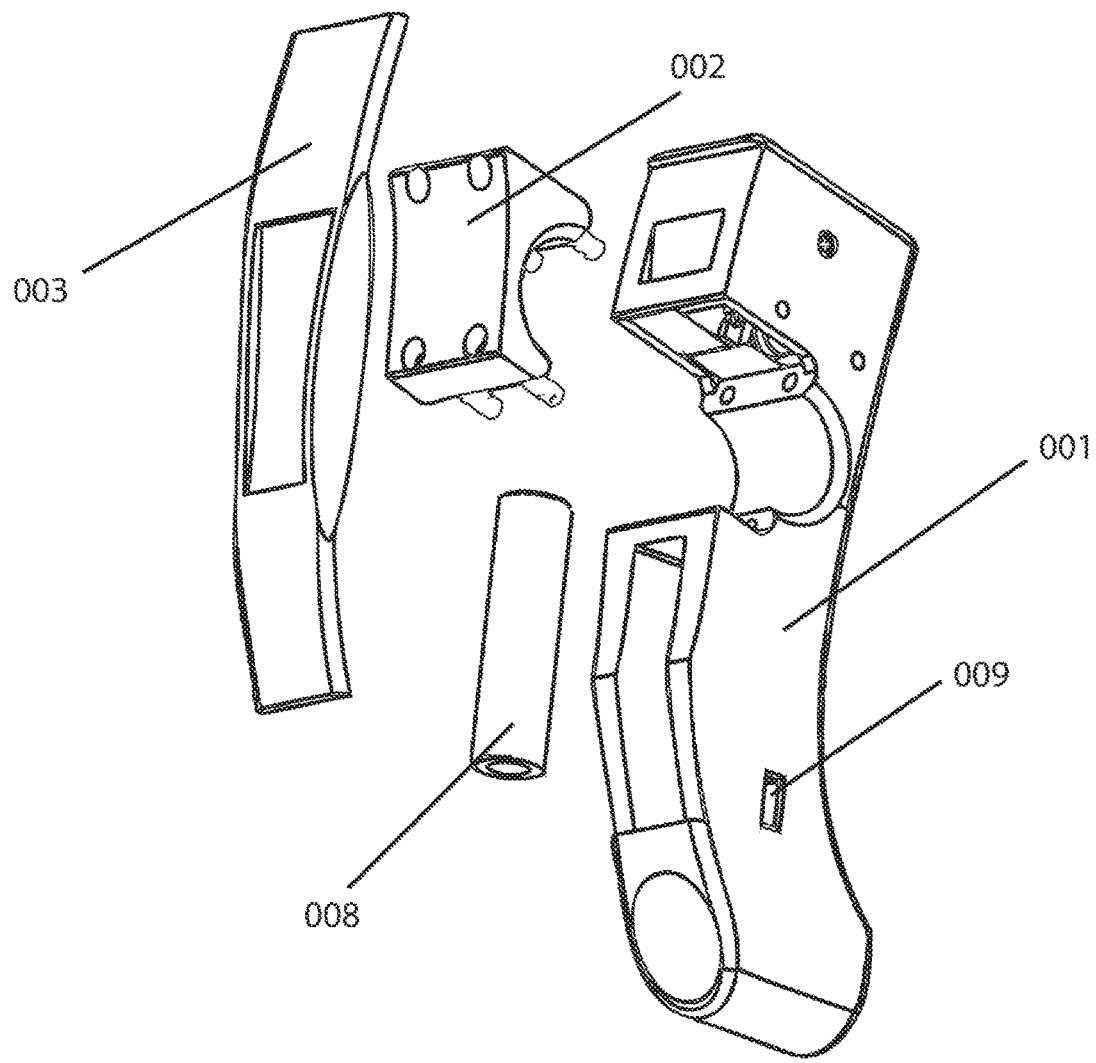
FIG. 12 is another perspective view of the lighting stem assembly showing the removable parts of the lighting stem assembly disassembled from each other, as another embodiment of the subject matter.

FIG. 12 is another perspective view of the lighting stem assembly 001 showing the removable parts of the lighting stem assembly 001 disassembled from each other. It can be seen that the lighting stem assembly 001 includes the rotatable lighting source 002 fitted inside the lighting stem assembly 001, the battery 008 mounted under the top surface of the lighting stem assembly 001, and the control panel 003 provided on the top surface of the lighting stem assembly 001. Furthermore, the FIG. 12 shows the power socket 009.

Figure 13:
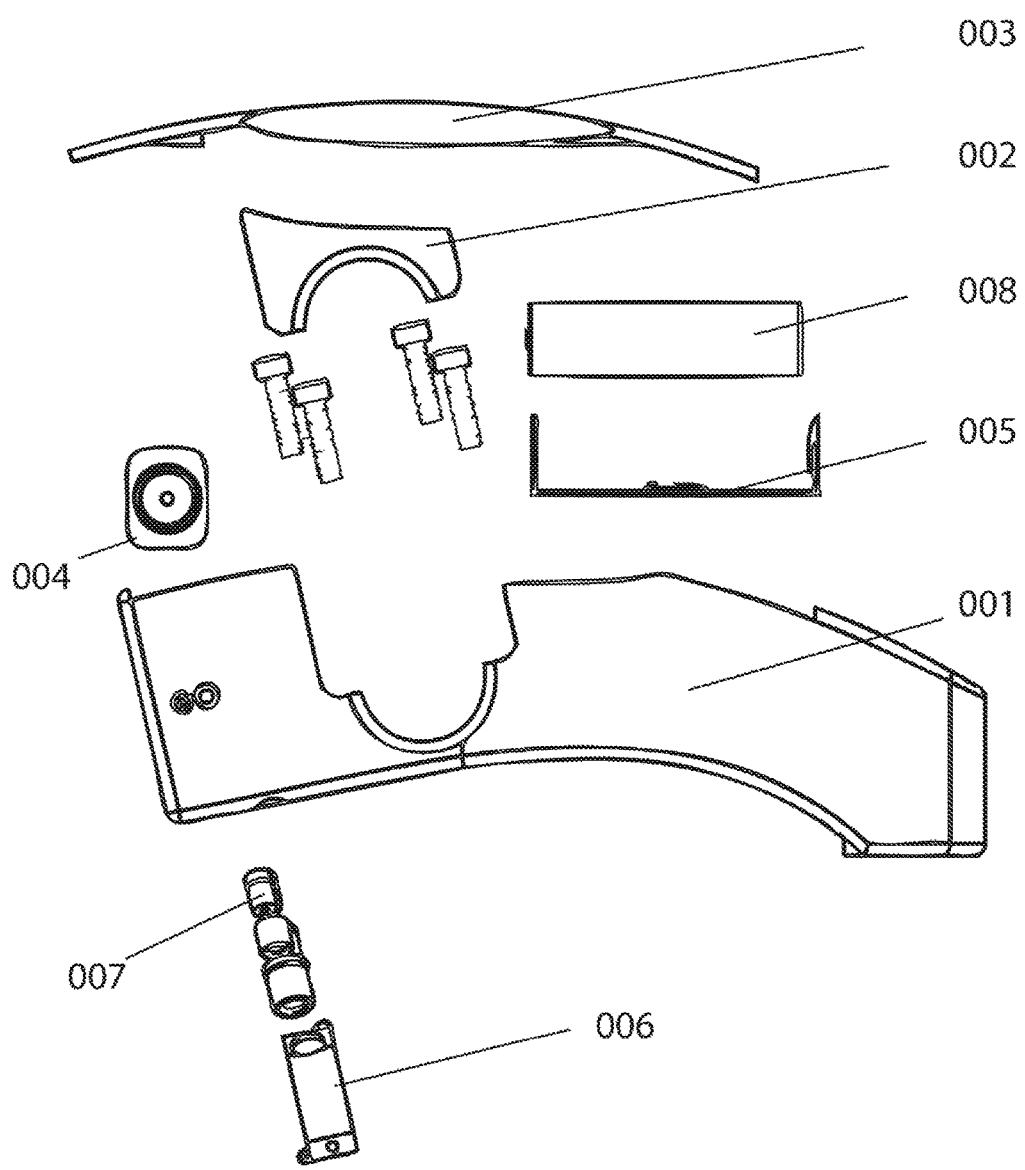
FIG. 13 shows a right-side view of the lighting stem assembly showing the components disassembled from each other, as another embodiment of the subject matter.

FIG. 13 shows a right-side view of the lighting stem assembly 001 showing the components disassembled from each other. FIG. 13 shows the rotatable lighting source 002, the control panel 003, the rotor 004 powering the rotatable lighting source 002, the light control PCB module 005, the motor 006 coupled to the rotor 004, the left indicator and the right indictor 007, and the battery 008. All the above-mentioned components can be disassembled for each other.

Figure 14:
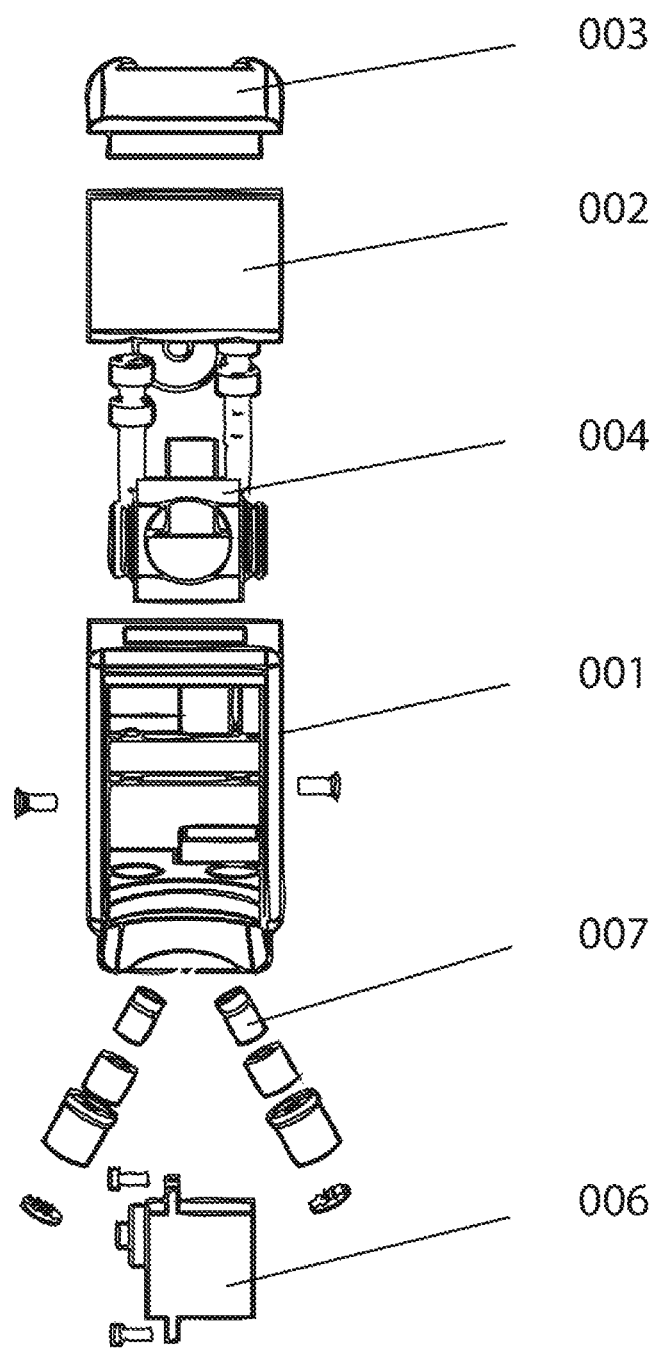
FIG. 14 shows a front view of the lighting stem assembly showing the various components disassembled from each other, as another embodiment of the subject matter.

FIG. 14 shows a front view of the lighting stem assembly 001 showing the various components disassembled from each other. Starting from rear end of the lighting stem assembly 001, the lighting stem assembly 001 includes the motor 006, the left and right indicator lights 007, the rotor 004, the rotatable lighting source 002, and the control panel 003.

Figure 15:
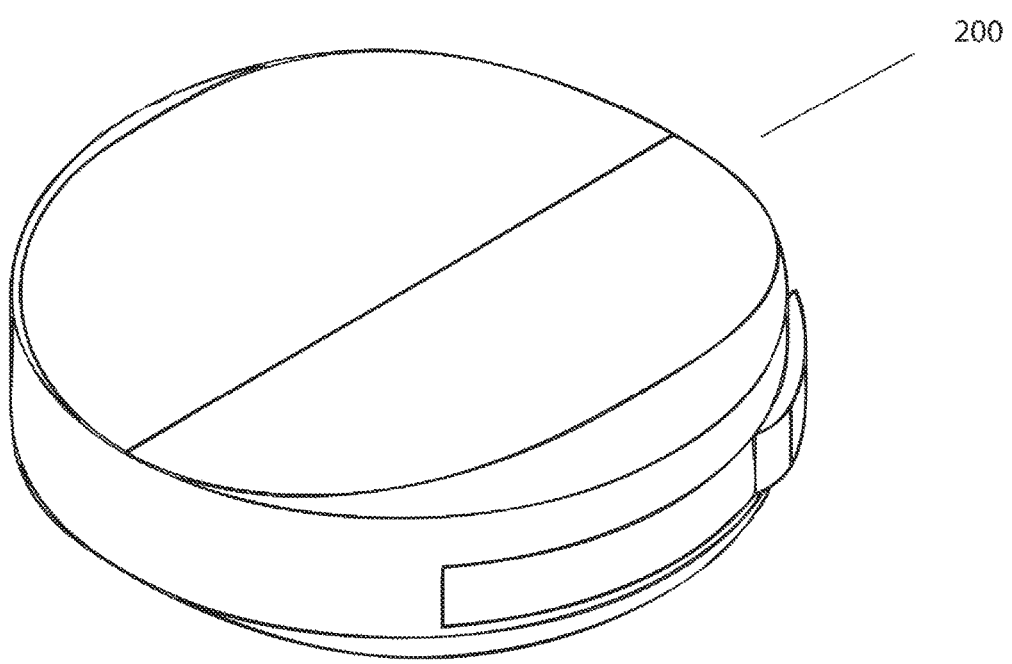
FIG. 15 shows a motion sensor, as another embodiment of the subject matter.

FIG. 15 shows a motion sensor 200. The motion sensor, as mentioned before, in one embodiment, detects the gestures performed by the rider of the bicycle using their head. For example, the gesture may include the head of the rider moving up and down. Based on the said movement of the head, the motion sensor 200 generates a signal which may be used to cause the movement of the rotatable light source 002. In another example, the gesture performed using the head of the rider includes moving the head sideways to the left or to the right side. Based on the sideways movement of the head, the motion sensor then generates a signal to cause activation of either the left indicator light or the right indictor light.

As it can be seen, the motion sensor 200 may have a curved shape. The curved shape of the motion sensor 200 allows the motion sensor 200 to be easily mounted onto the helmet of the rider.

Figure 16:
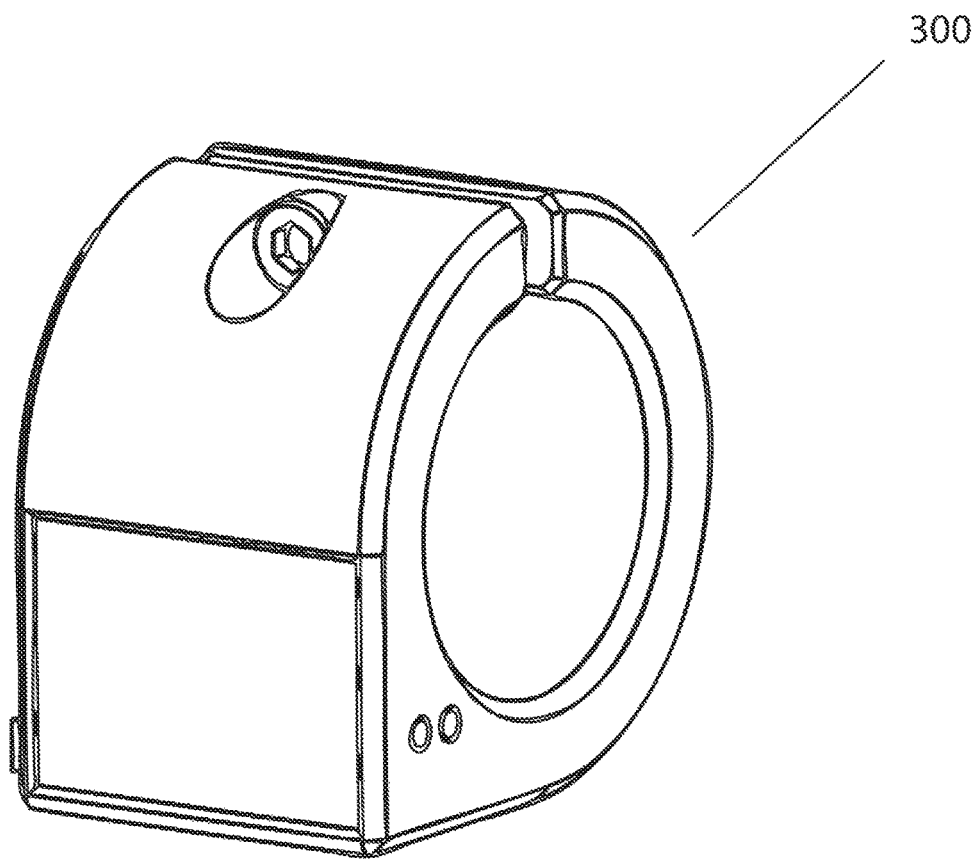
FIG. 16 shows a perspective view of a remote control, as another embodiment of the subject matter.

FIG. 16 shows a perspective view of a remote control 300. The remote control 300 may be used for controlling the operation of the rotatable lighting source 002, and the left indicator light 007a and the right indictor light 007b. For example, the remote control 300 may be used to control the orientation and the upwards and downwards rotation of the rotatable lighting source 002, and the activation and deactivation of the left indicator light 007a and the right indictor light 007b. The remote control 300 may be used when the motion sensor 200 is not in use. Using the Remote Control 300, the rider can control the lighting stem assembly 001 manually by one click or touch.

Figure 17:
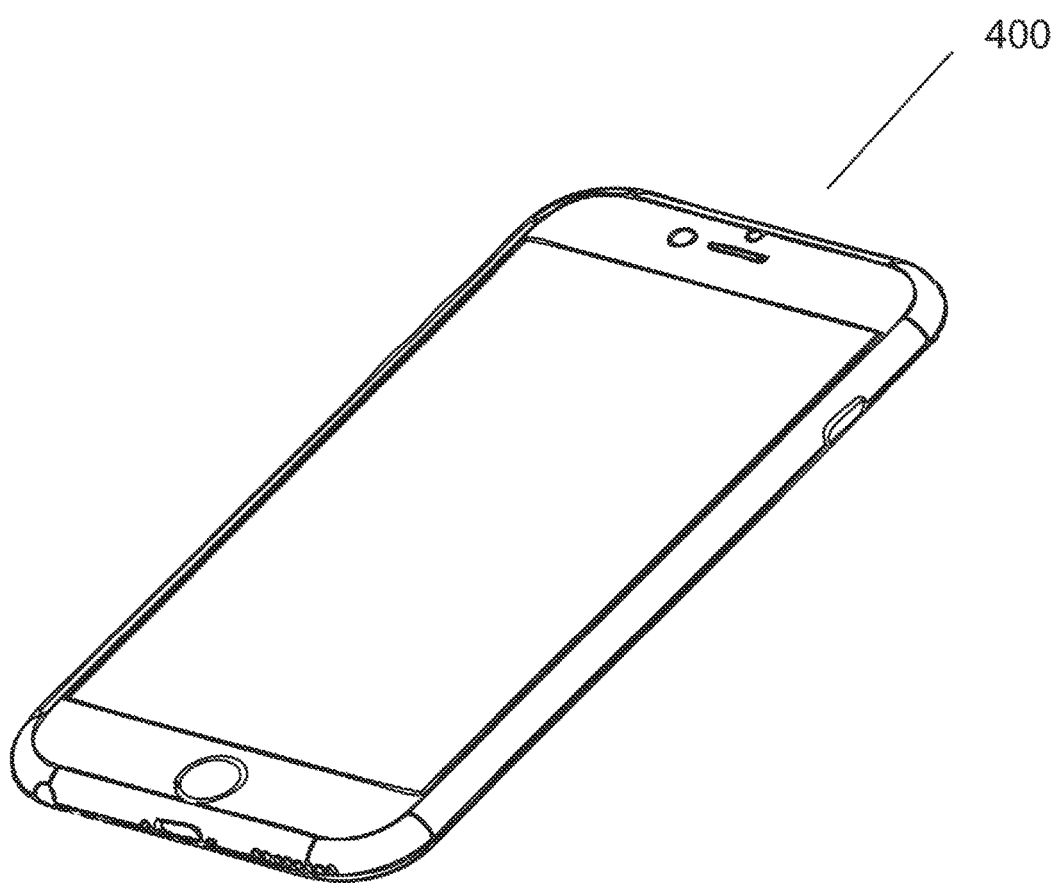
FIG. 17 shows a perspective view of a Smartphone, as another embodiment of the subject matter.

FIG. 17 shows a perspective view of a Smartphone 400. The Smartphone 400 may be used for configuring and controlling the orientation and the upwards and downwards rotation of the rotatable lighting source 002, and the activation and deactivation of the left indicator light 007a and the right indictor light 007b when the motion sensor 200 is not in use.

Figure 18:
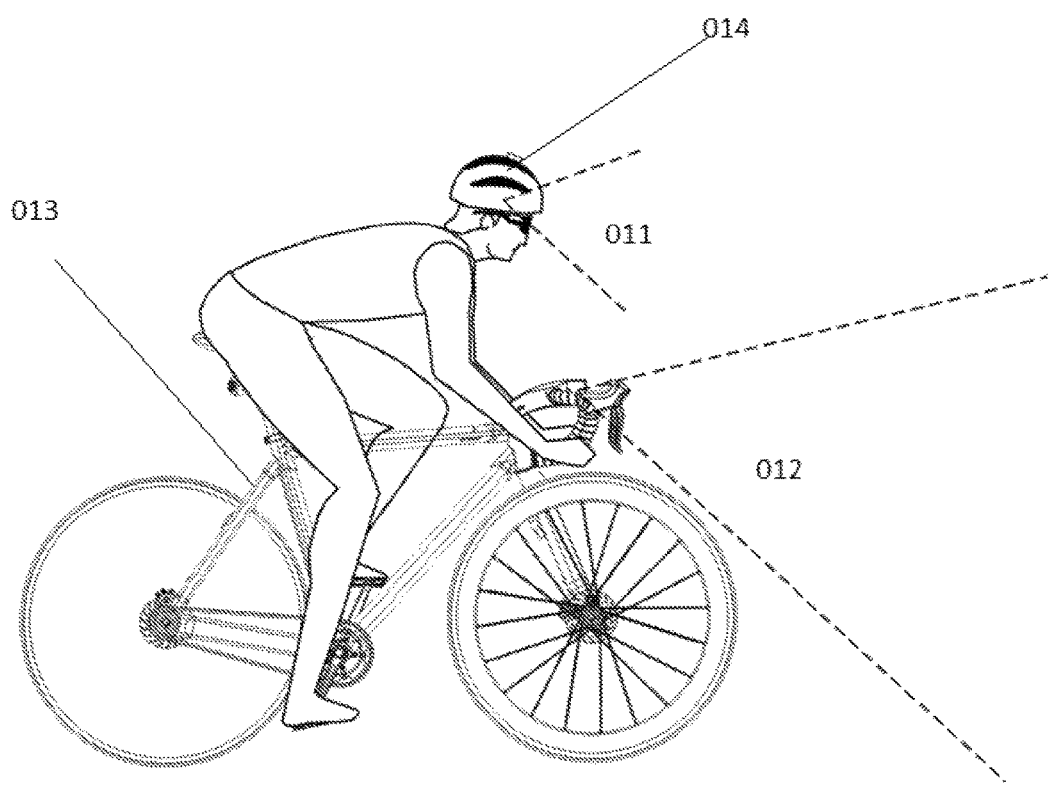
FIG. 18 shows an example of a smart lighting system implemented on a bicycle and a bicycle rider, as an embodiment of the subject matter.

FIG. 18 shows an example of a smart lighting system implemented on a bicycle and a bicycle rider. The lighting stem assembly 001 of the smart lighting system is mounted on the bicycle. The lighting stem assembly 001 further includes signal generator 011 mounted on the helmet 014 of the rider of the bicycle 013. The signal generator 011 could be a motion sensor 200. The lighting stem assembly 001, as explained earlier, includes signal receiver 012 communicating with the motion sensor 200 over a wireless connection like Bluetooth and Wi-Fi.

During working of the smart lighting system, the motion sensor 200 detects gesture performed using head of the rider of the bicycle 013 for controlling the various lightings like rotatable lighting source 002, and the left indicator light 007a and the right indictor light 007b. Corresponding to the gesture detected by the motion sensor 200, the signal generator 011 generates a signal to be received by the signal receiver 012.

The signal receiver 012 is mounted on the lighting stem assembly 001. Upon receiving the signal generated by the signal generator 011, the signal receiver 012 passes the signal to the light control PCB module 005. The light control PCB module 005 is further connected to the various lightings like rotatable lighting source 002, and the left indicator light 007a and the right indictor light 007b.

For example, the motion sensor 200 may detect the gesture of head of the rider moving up and down. Based on the gesture as detected by the motion sensor 200, the signal generator 011 generates a signal to cause the movement of the rotatable lighting source 002 to an extent and speed corresponding to the movement of the head of the rider so that the light beam projection is always in line with the direction in which eyes of the rider are pointing. The signal generated by the signal generator 011 is received by the signal receiver 012. The signal received by the signal receiver 012 is then passed on to the light control PCB module 005. The light control PCB module 005 then communicates with the motor 006 to activate the motor 006. The motor 006 further powers rotor 004. The rotor is coupled to the rotatable lighting source 002 and causes rotation of the rotatable lighting source 002 to thereby change the orientation of the rotating lighting source.

Upon activation of the rotatable lighting source 002, the light produced by the rotatable lighting source 002 is projected ahead of the rider riding the bicycle 013. The rotatable lighting source 002 is oriented downwards to project light and illuminate the region nearer to the bicycle. Thus, to illuminate the region nearer to the bicycle, the rotatable lighting source 002 is rotated in anti-clockwise direction by the rotor 004. On the other hand, the rotatable lighting source 002 may be oriented upwards to project light and illuminate region farther away from the bicycle by rotating the rotatable lighting source 002 clockwise using the rotor 004. The rotor 004 rotates with same angle and same speed as the head moving up and down so that the light beam projection is always parallel to the eye seeing level of the rider.

In another example, the motion sensor 200 may detect the gesture of head of the rider moving sideways to the left or the right side. Based on the movement of the head detected by the motion sensor 200, the signal generator 011 generates a signal to then cause activation of either the left indicator light 007a or the right indictor light 007b. The signal generated by the signal generator 011 is received by the signal receiver 012. The signal received by the signal receiver 012 is then passed on the to the light control PCB module 005. The light control PCB module 005 then communicates with the left indicator light 007a and the right indictor 007b to then activate either the left indicator light 007a or the right indictor 007b. Upon activation, the left indicator light 007a or the right indictor 007b project light on the ground on the left or the right side of bicycle, thereby providing indication to the other commuters on the road about the intention of the rider of the bicycle of turning in either the left or the right direction, as well as illuminating the path for rider of the bicycle in the left or the right side. This further makes the riding experience more convenient and safer for the rider.

Figure 19:
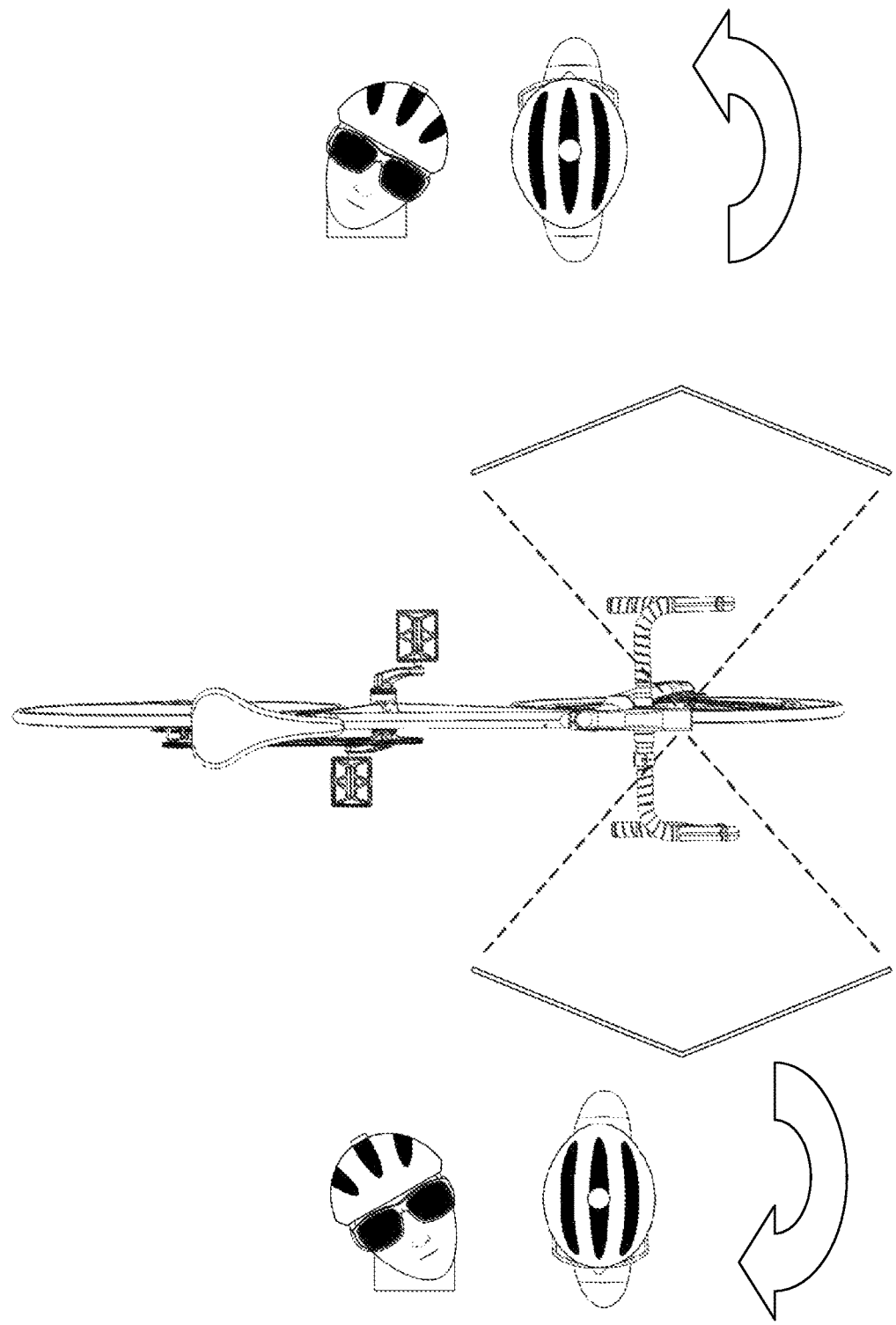
FIG. 19 illustrates various views of the bicycle and the gestures produced by the head of the rider of the bicycle, as an embodiment of the subject matter.

FIG. 19 illustrates various views of the bicycle 013 and the gestures produced by the head of the rider of the bicycle during the working of the left indicator light 007a and the right indictor 007b in accordance with the gestures detected by the motion sensor 200 of the head of the rider of the bicycle 013. As shown, as the head moves sideways to the left side, the signal generator 011 mounted on the helmet 014 generates a signal to then cause activation of the left indicator light 007a. The signal generated by the signal generator 011 is received by the signal receiver 012, which is then passed to the light control PCB module 005. The light control PCB module 005 then communicates with the left indicator light 007a to then activate the left indicator light 007a. The left indicator light 007a then projects light on the ground on the left side of bicycle to thereby provide turning indication and illuminating path for rider of the bicycle on the left side.

Similarly, as the head of the rider of the bicycle 013 moves sideways to the right side, the signal generator 011 mounted on the helmet 014 generates a signal to then cause activation of the right indicator light 007b. The signal generated by the signal generator 011 is received by the signal receiver 012, which is then passed to the light control PCB module 005. The light control PCB module 005 then communicates with the right indicator light 007b to then activate the right indicator light 007b. The right indicator light 007b then projects light on the ground on the right side of bicycle to thereby provide turning indication and illuminating path for rider of the bicycle on the right side.

Figure 20:
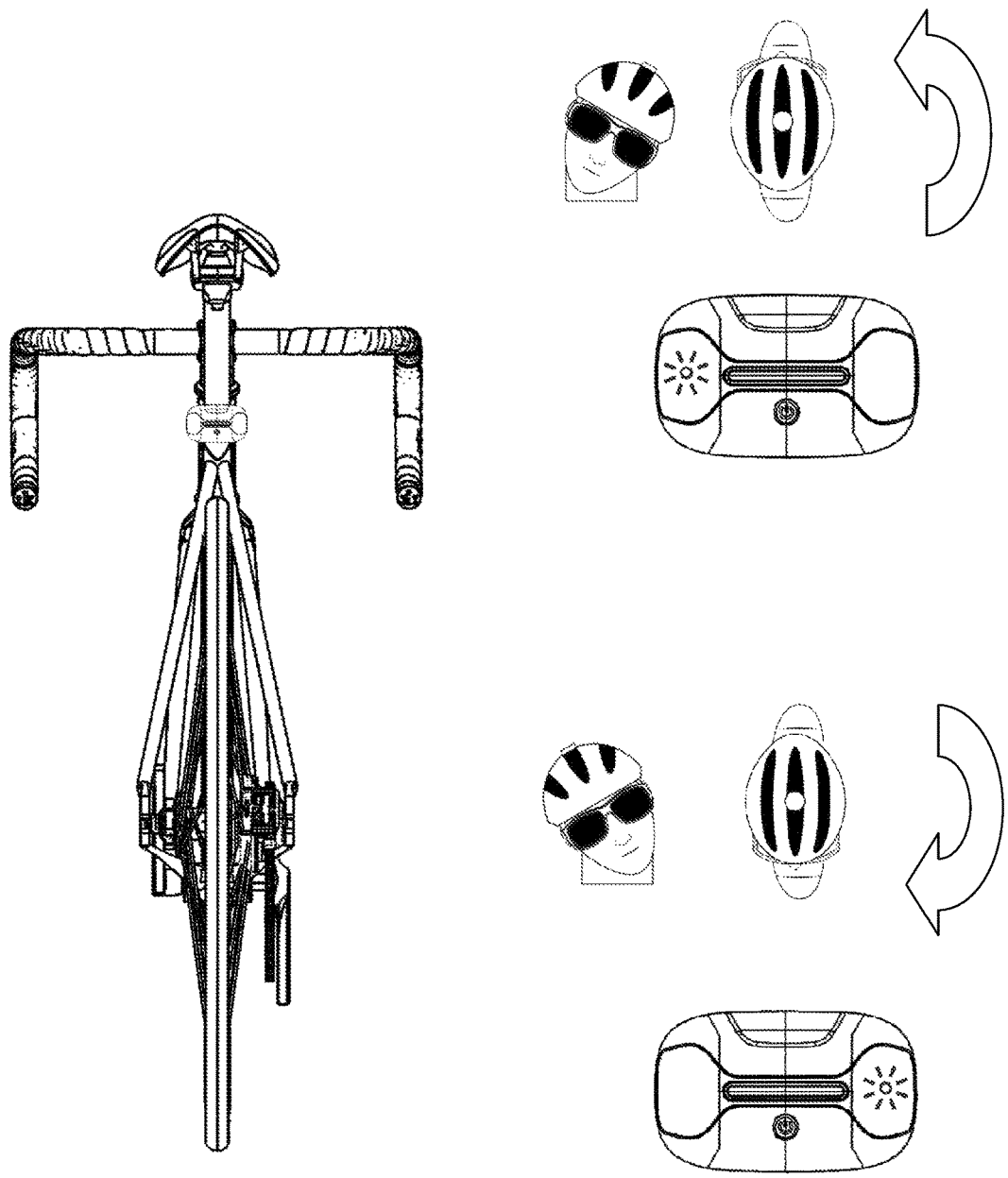
FIG. 20 further illustrates various views of the bicycle, the gestures produced by the head of the rider of the bicycle, and the illumination produced by the left indicator light and the right indictor light, as an embodiment of the subject matter.

FIG. 20 further illustrates various views of the bicycle 013, the gestures produced by the head of the rider of the bicycle, and the illumination produced by the left indicator light 007a and the right indictor light 007b during the working of the left indicator light 007a and the right indictor 007b in accordance with the gestures detected by the motion sensor 200 of the head of the rider of the bicycle 013. Again, as the head moves sideways to the left side, the signal generator 011 mounted on the helmet 014 generates a signal to then cause activation of the left indicator light 007a. Similarly, as the head of the rider of the bicycle 013 moves sideways to the right side, the signal generator 011 mounted on the helmet 014 generates a signal to then cause activation of the right indicator light 007b.

Figure 21:
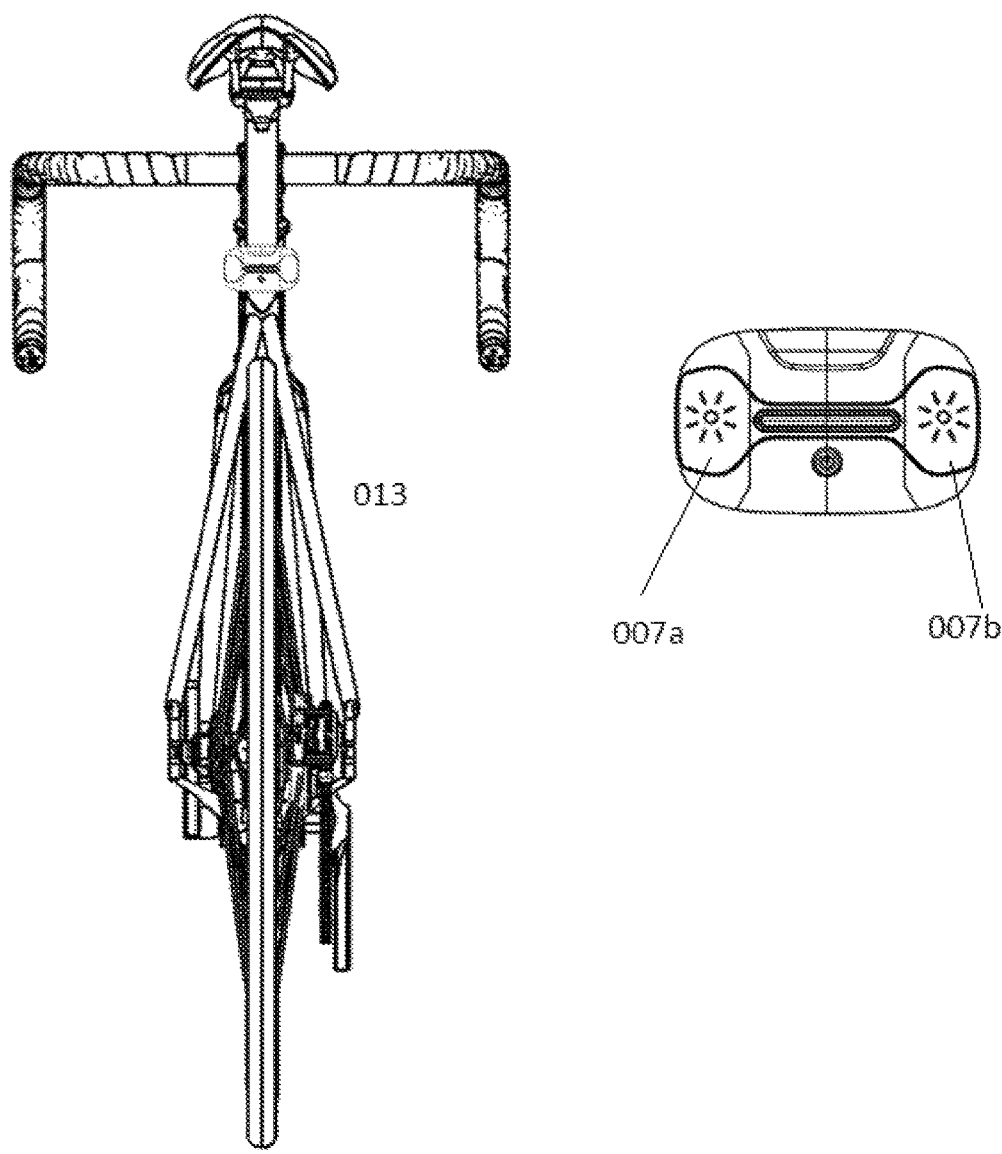
FIG. 21 shows another implementation of smart lighting system during braking or deceleration of the bicycle, as an embodiment of the subject matter.

FIG. 21 shows another implementation of smart lighting system during braking or deceleration of the bicycle. During braking or deceleration of the bicycle, it is desirable to provide indication to the other commuters on the road about the slowing down and stopping of the bicycle 013. Accordingly, during braking or deceleration of the bicycle 013, both the left indicator light 007a and the right indictor light 007b are illuminated to project light on both the left and the right side of the bicycle 013. Such an indication further aids in assuring safety of the riders in dark riding conditions.

The bicycle is equipped with braking and motion detection sensors. The braking and the motion detection sensors may detect the speed of the bicycle, and based on slowing of the bicycle detect possible deceleration or stopping of the bicycle 013. Upon detecting the deceleration or braking of the bicycle 013, the motion detection sensors may then generate signals which are received by the signal receiver 012 of the lighting stem assembly 001. The signal is then being passed to the light control PCB module 005. The light control PCB module 005 then communicates with the left indicator light 007a and the right indictor light 007b to activate both the left indicator light 007a and the right indictor light 007b. The left indicator light 007a and the right indictor light 007b then project light on the ground on both the left side and right side of bicycle to thereby provide indication of braking or decelerating of the bicycle 013.

Figure 22:
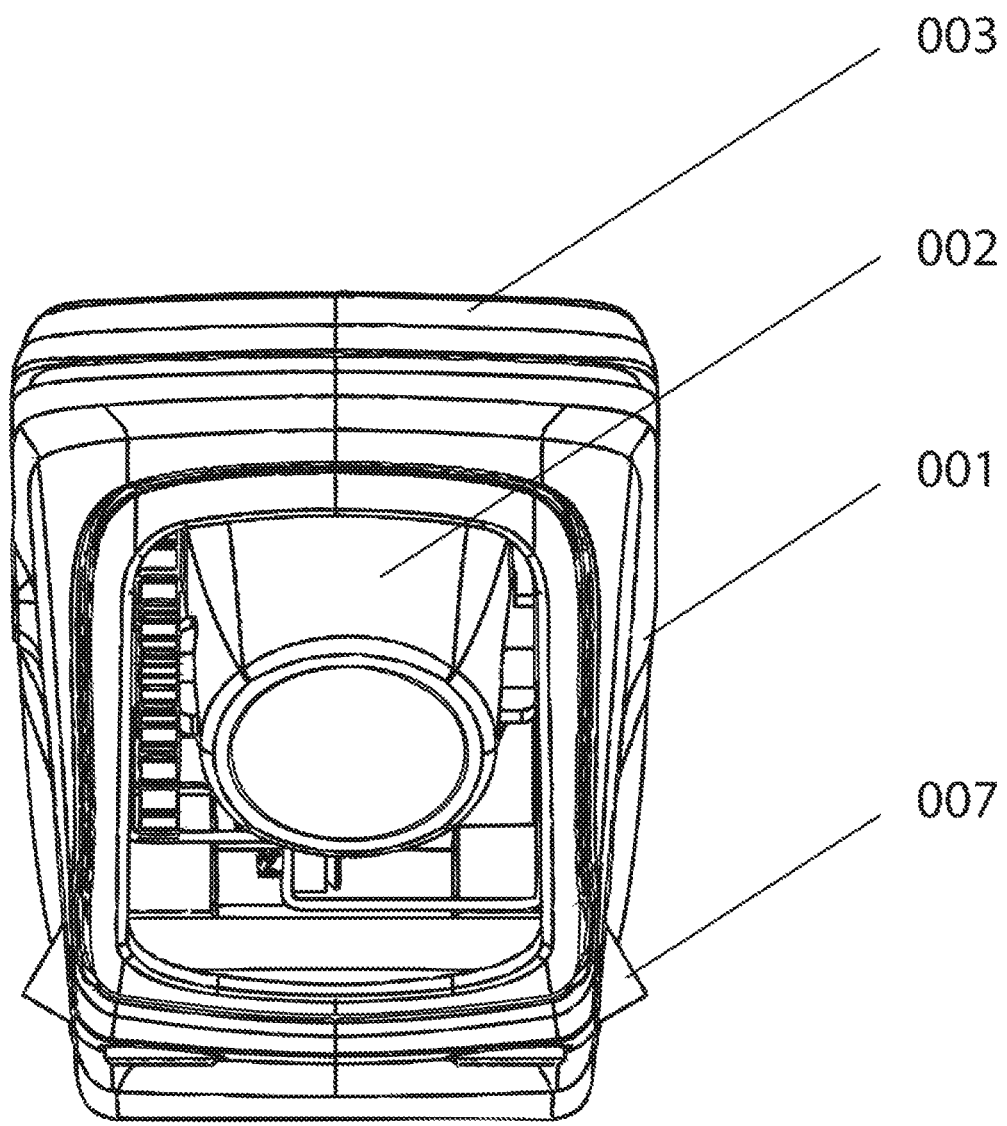
FIG. 22 shows a top view of another embodiment of the lighting stem assembly, as an embodiment of the subject matter.

FIG. 22 shows top view of another embodiment of the lighting stem assembly 001. As it can be seen, the lighting stem assembly 001 includes the rotatable lighting source 002, the left indicator light 007a and the right indictor light 007b, and the control panel 003.

Figure 23:
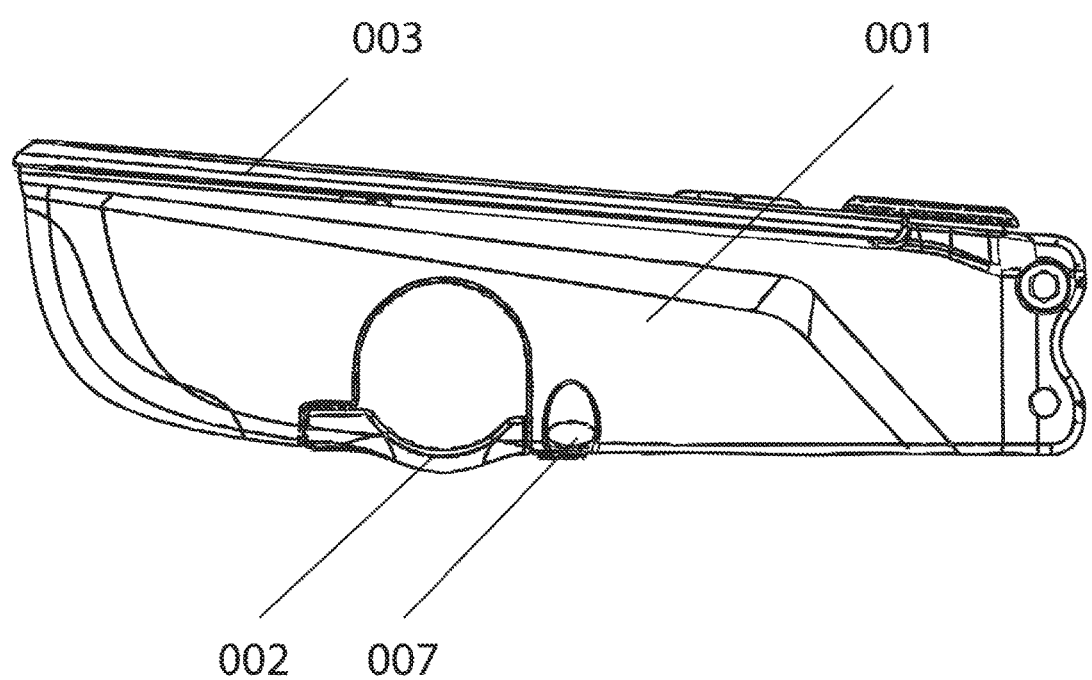
FIG. 23 depicts a right-side view of another embodiment of the lighting stem assembly, as an embodiment of the subject matter.

FIG. 23 depicts a right-side view of another embodiment of the lighting stem assembly 001. As it can be seen in FIG. 23, the lighting stem assembly 001 includes the rotatable lighting source 002 provided on the front end of the lighting stem assembly 001, the left and right indicator lights 007 provided at the bottom of the lighting stem assembly 001, and the control panel 003 provided on the top of the lighting stem assembly 001.

Figure 24:
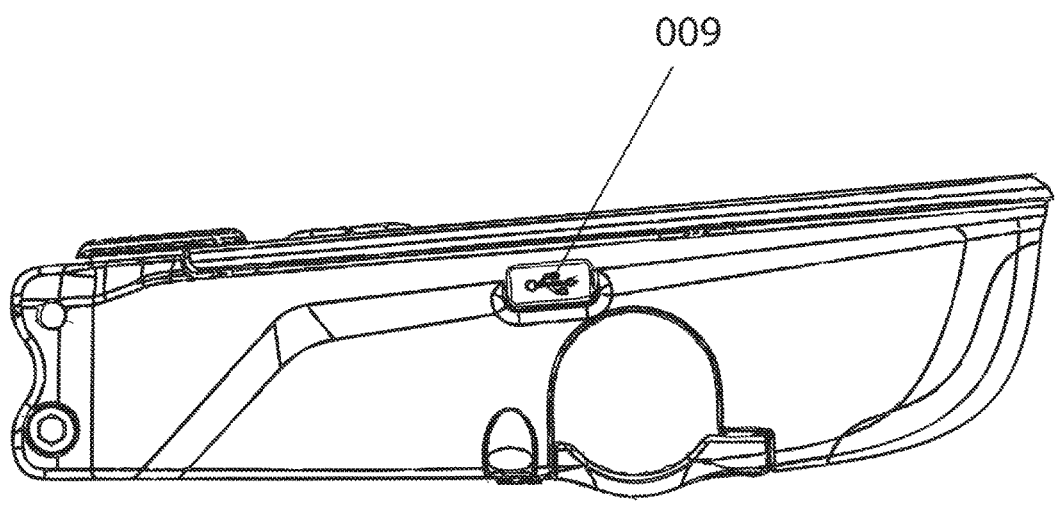
FIG. 24 depicts a left side view of another embodiment of the lighting stem assembly, as an embodiment of the subject matter.

FIG. 24 depicts a left side view of another embodiment of the lighting stem assembly 001. As it can be seen in FIG. 24, the lighting stem assembly 001 includes a power socket 009 which can be used for powering and charging various electronic devices, such as mobile phones. The power socket 009 may be a USB port.

Figure 25:
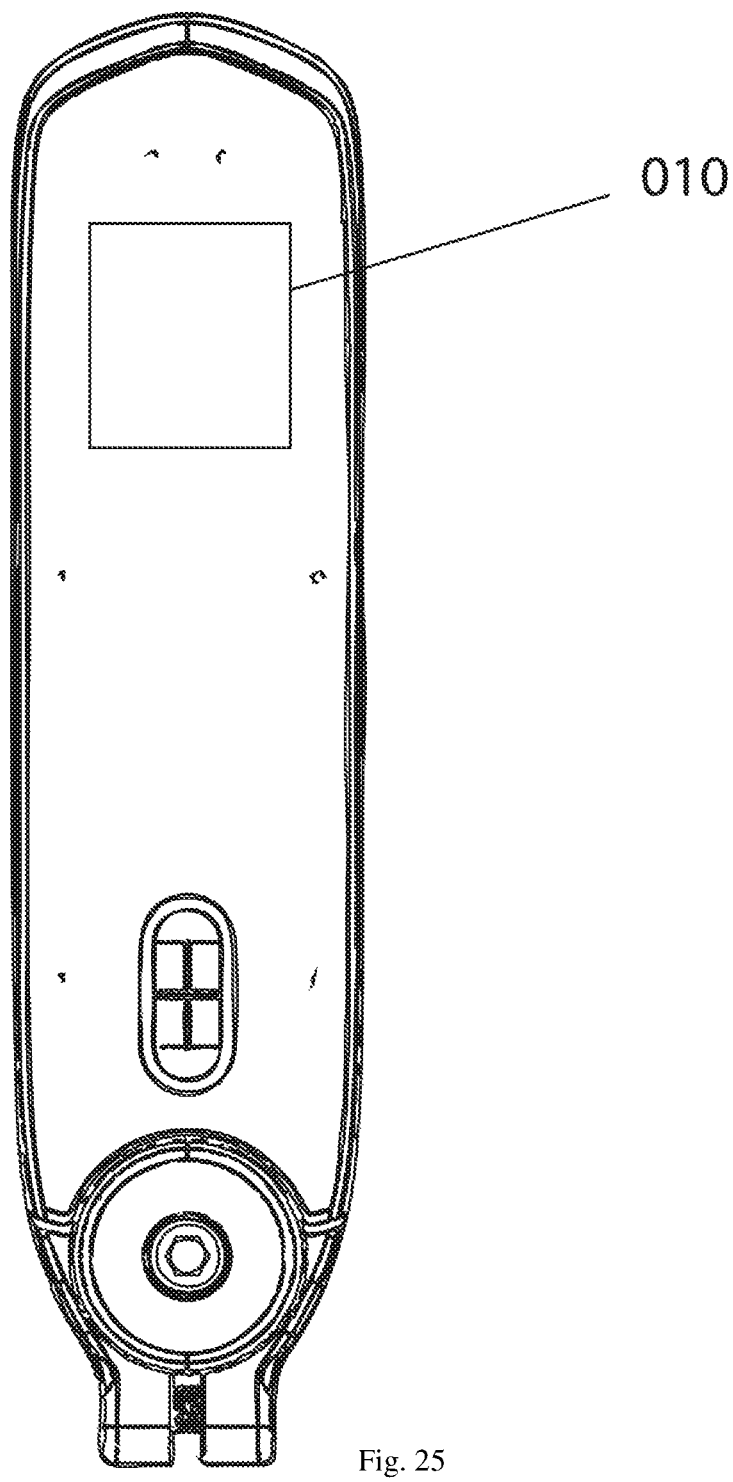
FIG. 25 shows a top view of another embodiment of the lighting stem assembly, as an embodiment of the subject matter.

FIG. 25 shows a top view of another embodiment of the lighting stem assembly 001. The FIG. 25 shows a display screen 010 of the control panel of the lighting stem assembly 001. The control panel may include the display screen 010 to display information about the various parameters associated with the bicycle, such as speed, slope, time, battery status. The display screen 010 is provided on the top surface of the lighting stem assembly 001 for easy viewing and access by the rider of the bicycle. In an embodiment, the display screen 010 is a touch-enabled screen.

Figure 26:
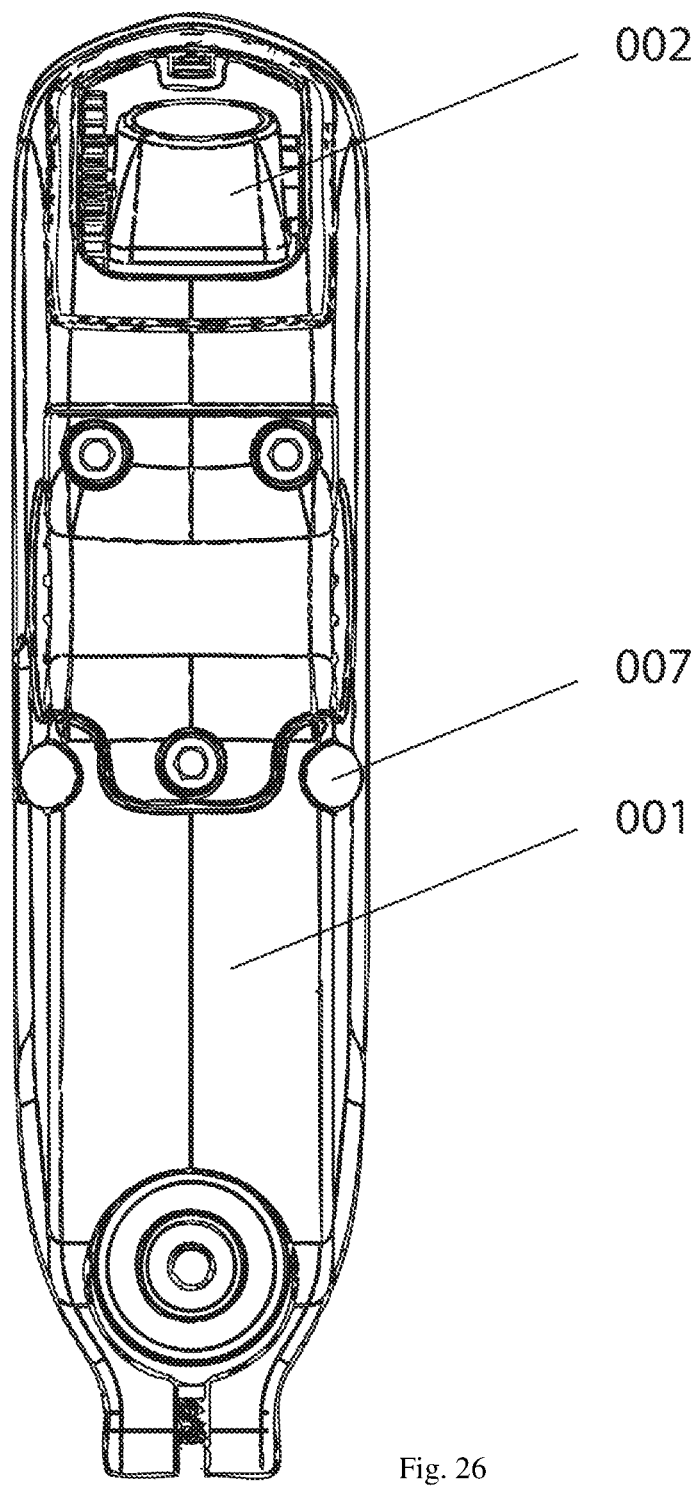
FIG. 26 shows a bottom view of another embodiment of the lighting stem assembly, as an embodiment of the subject matter.

FIG. 26 shows a bottom view of another embodiment of the lighting stem assembly 001. It can be seen that the rotatable lighting source 002 is provided on the front end of the lighting stem assembly 001, such that upon activation of the rotatable lighting source 002, the light produced by the rotatable lighting source 002 is projected ahead of the rider riding the bicycle. Further, lighting stem assembly 001 includes the left indicator light 007a and the right indictor 007b. The left indicator light 007a and the right indictor light 007b are provided along the two longitudinal sides of the lighting stem assembly 001 at the bottom of the lighting stem assembly 001.

Figure 27:
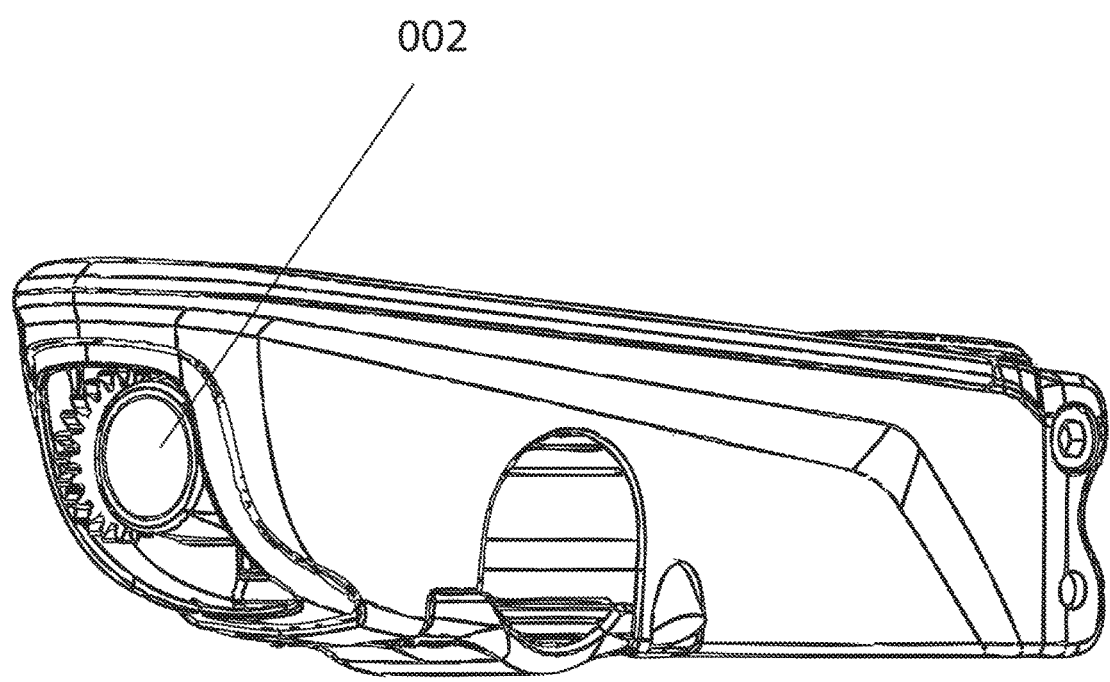
FIG. 27 shows a perspective view of another embodiment of the lighting stem assembly, as an embodiment of the subject matter.

FIG. 27 shows a perspective view of another embodiment of the lighting stem assembly 001. It can be seen that the rotatable lighting source 002 is provided on the front end of the lighting stem assembly 001. The rotatable lighting source 002 is allowed to rotate so that the orientation of the rotatable lighting source 002 and the light produced by the rotatable lighting source 002 can be varied. Upon activation of the rotatable lighting source 002, the light produced by the rotatable lighting source 002 is projected ahead of the rider riding the bicycle. The rotatable lighting source 002 may rotate about a horizontal axis, as shown in the FIG. 27. Further, FIG. 27 shows the rotatable lighting source 002 oriented more upwards along the horizontal plane. In this orientation, the rotatable lighting source 002 projects light and illuminate region farther away from the bicycle, thereby providing a long-range illumination.

Figure 28:
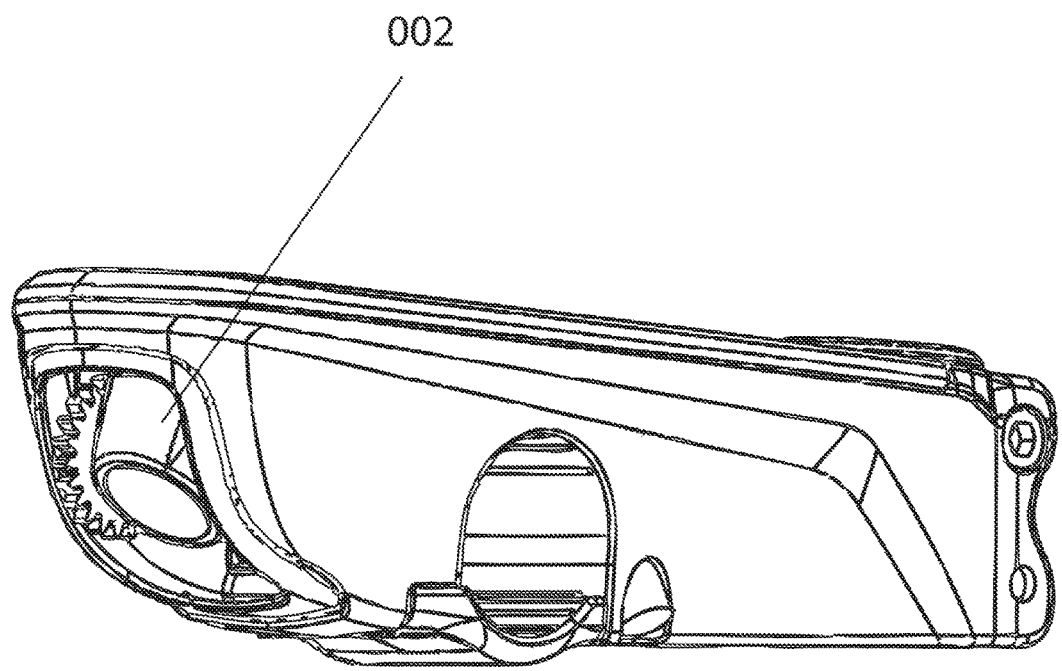
FIG. 28 shows a perspective view of another embodiment of the lighting stem assembly, as an embodiment of the subject matter.

FIG. 28 shows a perspective view of another embodiment of the lighting stem assembly 001 with the rotatable lighting source 002 positioned in a more downward orientation. As mentioned earlier, the rotatable lighting source 002 may rotate about a horizontal axis. Further, FIG. 28 shows the rotatable lighting source 002 oriented downwards more along the vertical plane. In this orientation, the rotatable lighting source 002 projects light and illuminate region nearer to the bicycle, thereby providing a short-range illumination.

Figure 29:
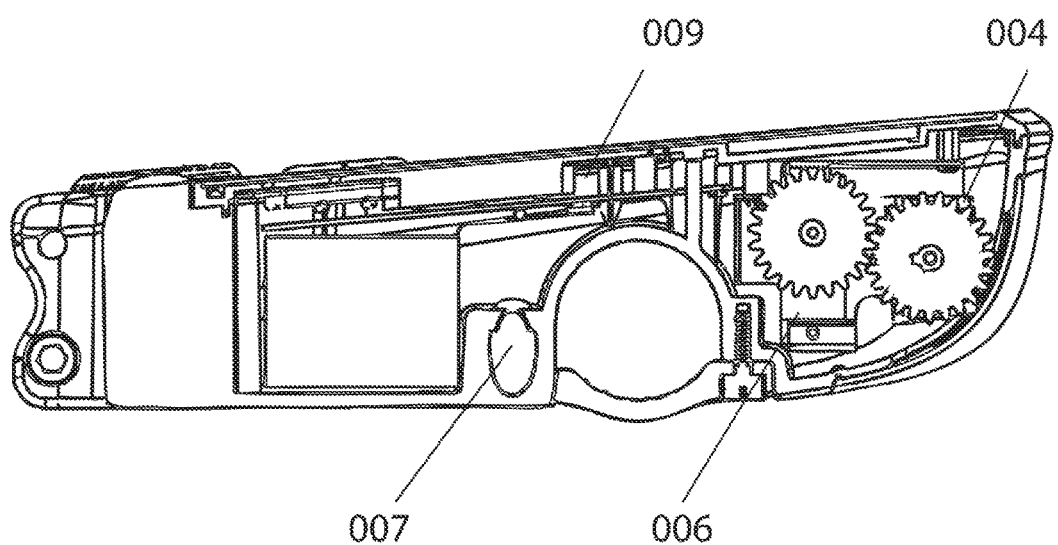
FIG. 29 shows a cross-section view of another embodiment of the lighting stem assembly, as an embodiment of the subject matter.

FIG. 29 shows a cross-section view of another embodiment of the lighting stem assembly 001. Various constituent components of the lighting stem assembly 001 can be seen. The lighting stem assembly 001 includes a rotor 004 coupled to the rotatable lighting source 002 and is responsible for causing the rotation of the rotatable lighting source 002. The rotor rotates the rotatable lighting source 002 depending upon the extent of rotation the rotatable lighting source 002 is required to undergo. The lighting stem assembly 001 further includes a motor 006 that powers the rotor 004. The motor 006 may be a direct current (DC) motor powered by a DC source, such as battery. Further, the left and right indicator lights 007 of the lighting stem assembly 001 are shown. Also, the power socket 009, such as a USB port of the lighting stem assembly 001 is shown.

Figure 30:
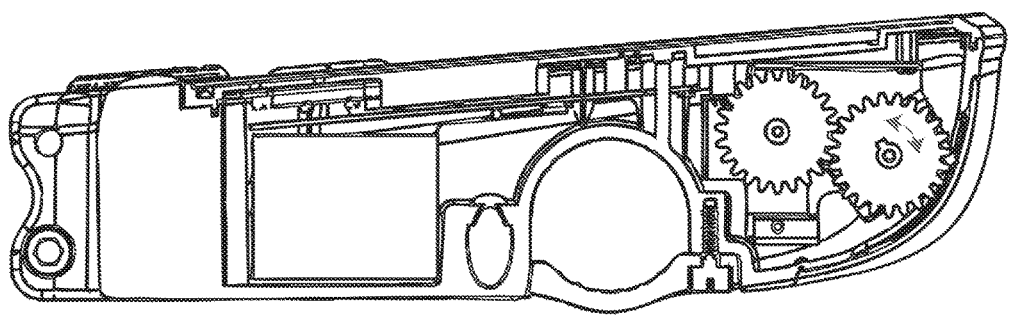
FIG. 30 shows the rotor of another embodiment of the lighting stem assembly in a second position after the rotor has undergone rotation, as an embodiment of the subject matter.

FIG. 30 shows the rotor 004 of another embodiment of the lighting stem assembly 001 in a second position after the rotor has undergone rotation. As mentioned earlier, the motor 006 powers the rotor 004 to drive the rotor to further provide rotational motion to the rotatable lighting source. Depending upon the desired angle of the rotatable lighting source 002, the motor may cause the rotor to rotate to a specific extent.

Figure 31:
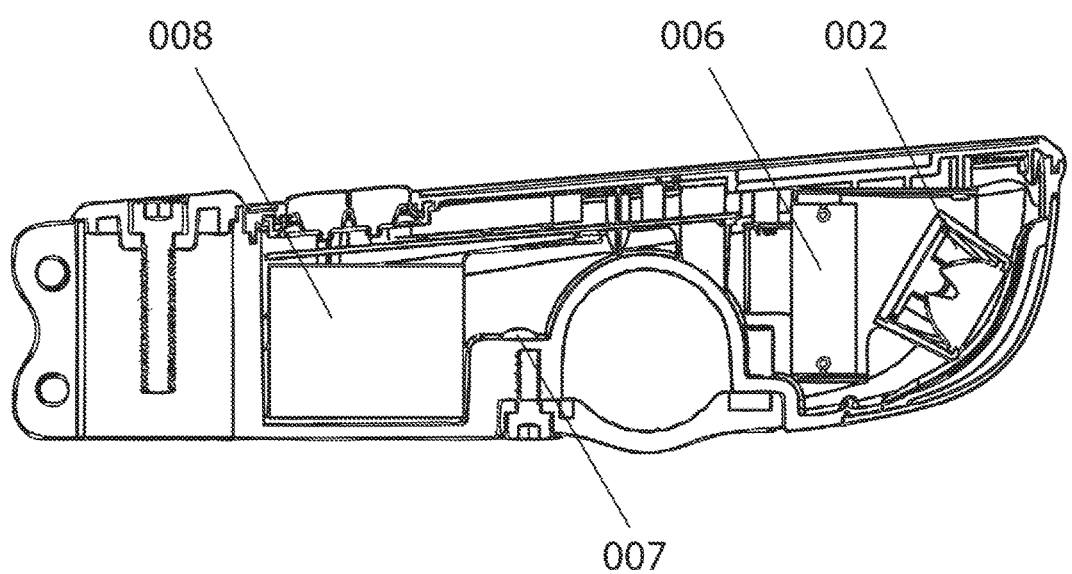
FIG. 31 shows another cross section view of another embodiment of the lighting stem assembly, as an embodiment of the subject matter.

FIG. 31 shows another cross section view of another embodiment of the lighting stem assembly 001. The rotatable lighting source 002 and the motor 006 can be seen. Further, the left and right indicator lights 007 of the lighting stem assembly 001 are shown. Furthermore, the battery 008 mounted in the lighting stem assembly 001 is shown. The battery 008 is provided to power the various components, such as the rotatable lighting source 002, the left indicator light 007a and the right indictor light 007b, the power socket 009, and the display screen 010. Further, the battery 008 is removable mounted in the lighting stem assembly 001, such that the battery 008 may be removed and replaced, as per the requirement.

Figure 32:
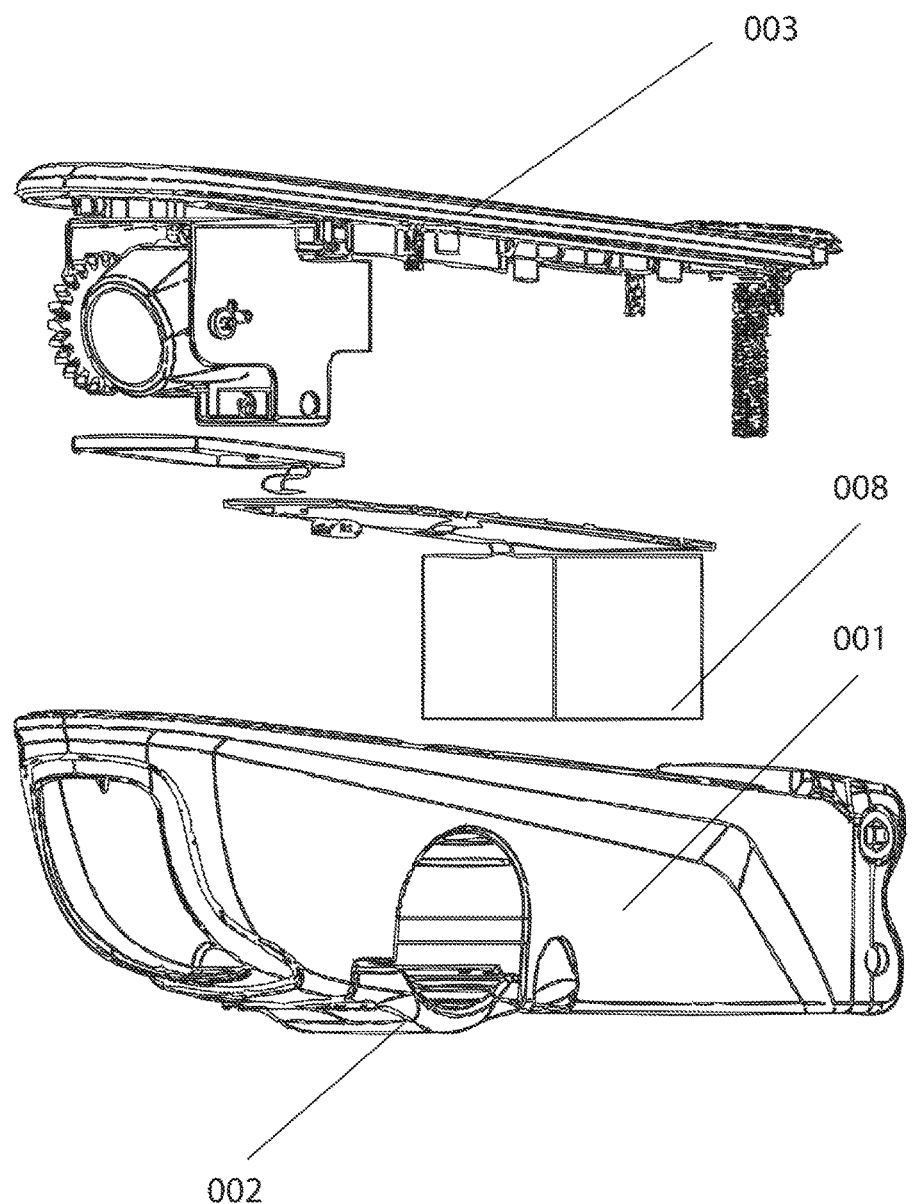
FIG. 32 shows a perspective view of another embodiment of the lighting stem assembly with the removable parts of the lighting stem assembly disassembled from each other, as an embodiment of the subject matter.

FIG. 32 shows a perspective view of another embodiment of the lighting stem assembly 001 with the removable parts of the lighting stem assembly 001 disassembled from each other. It can be seen that the battery 008 is mounted inside the lighting stem assembly 001 under the top surface of the lighting stem assembly 001. Further, the battery 008 may be removed by accessing the battery 008 by lifting the top surface of the lighting stem assembly 001. The rotatable lighting source 002 is fitted inside the lighting stem assembly 001. The control panel 003 is provided on the top surface of the lighting stem assembly 001. Therefore, to access the battery 008, first, the control panel 003 may be required to disassembled and separated.

Figure 33:
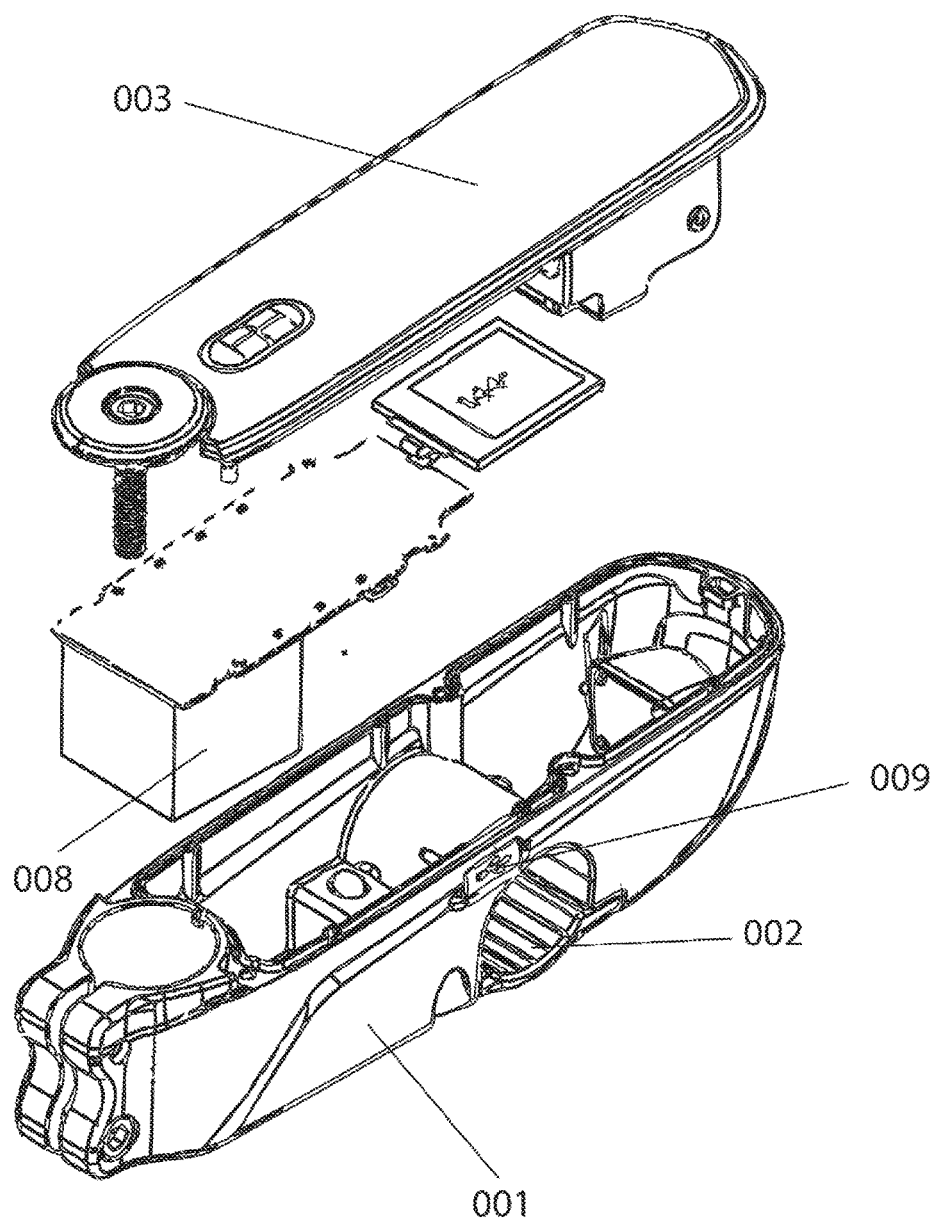
FIG. 33 shows another perspective view of another embodiment of the lighting stem assembly showing the removable parts of the lighting stem assembly disassembled from each other, as an embodiment of the subject matter.

FIG. 33 shows another perspective view of another embodiment of the lighting stem assembly 001 showing the removable parts of the lighting stem assembly 001 disassembled from each other. The lighting stem assembly 001 includes the rotatable lighting source 002 fitted inside the lighting stem assembly 001, the battery 008 mounted under the top surface of the lighting stem assembly 001, and the control panel 003 provided on the top surface of the lighting stem assembly 001. Furthermore, the power socket 009 is shown.

Figure 34:
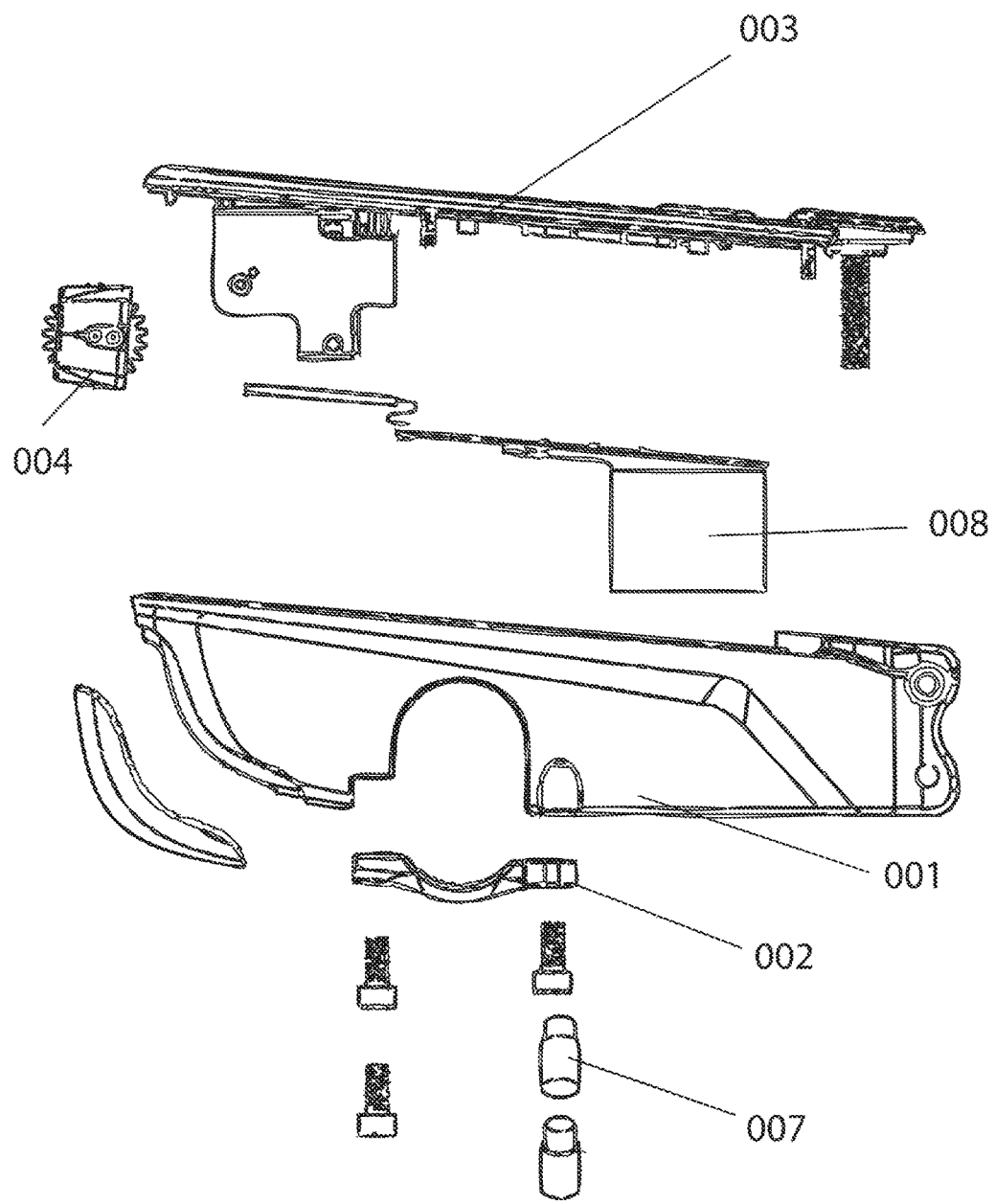
FIG. 34 shows a right-side view of another embodiment of the lighting stem assembly showing the components disassembled from each other, as an embodiment of the subject matter.

FIG. 34 shows a right-side view of another embodiment of the lighting stem assembly 001 showing the components disassembled from each other. Further, the rotatable lighting source 002, the control panel 003, the rotor 004 powering the rotatable lighting source 002, the light control PCB module 005, the motor 006 coupled to the rotor 004, the left indicator and the right indictor 007, and the battery 008 are shown. All the above-mentioned components can be disassembled form each other by unscrewing various screws.

Figure 35:
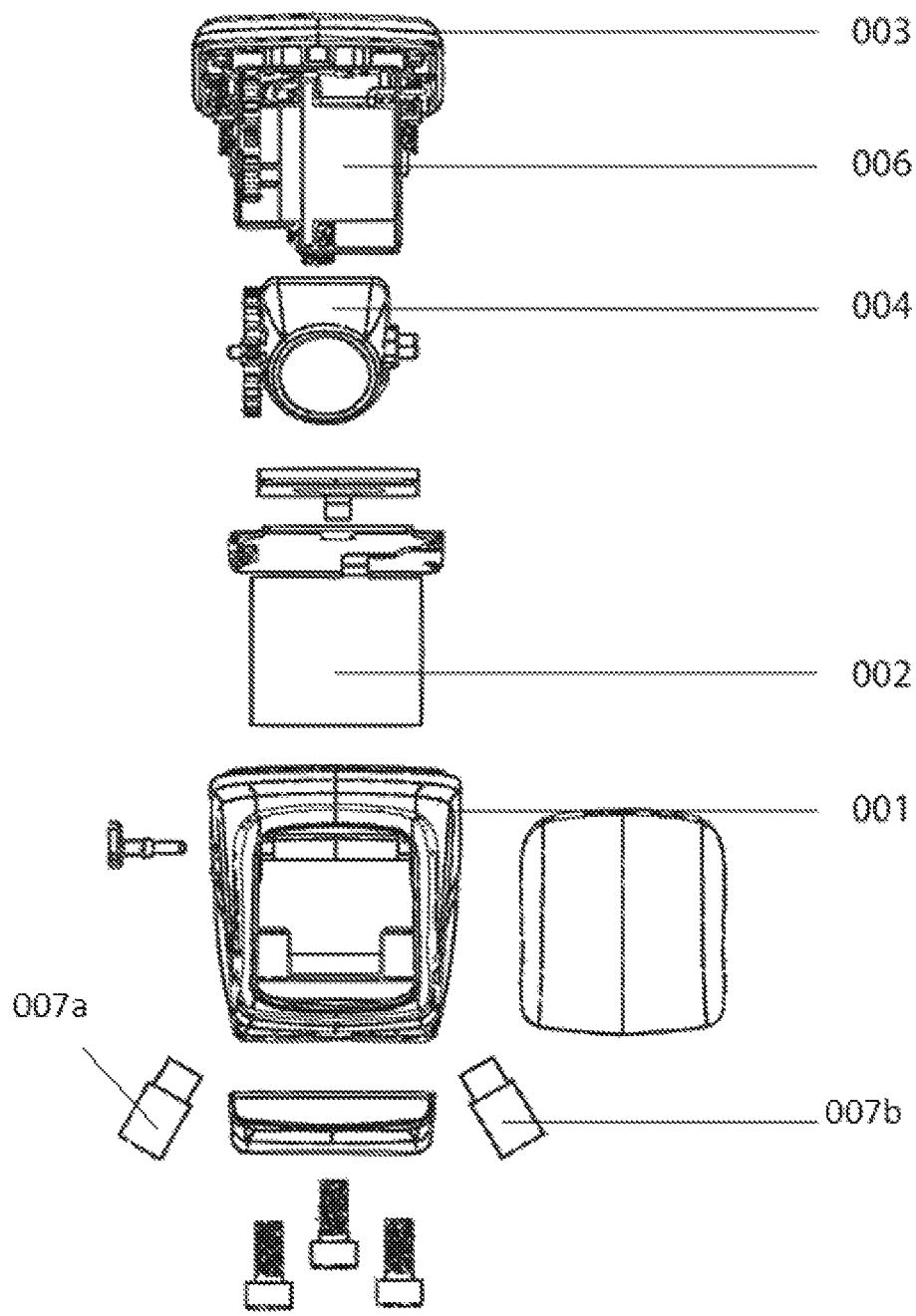
FIG. 35 shows a front view of another embodiment of the lighting stem assembly showing the various components disassembled from each other, as an embodiment of the subject matter.

FIG. 35 shows a front view of another embodiment of the lighting stem assembly 001 showing the various components disassembled from each other. Starting from rear end of the lighting stem assembly 001, the lighting stem assembly 001 includes the left and right indicator lights 007, the rotatable lighting source 002, the rotor 004, the motor 006, and the control panel 003.

Figure 36:
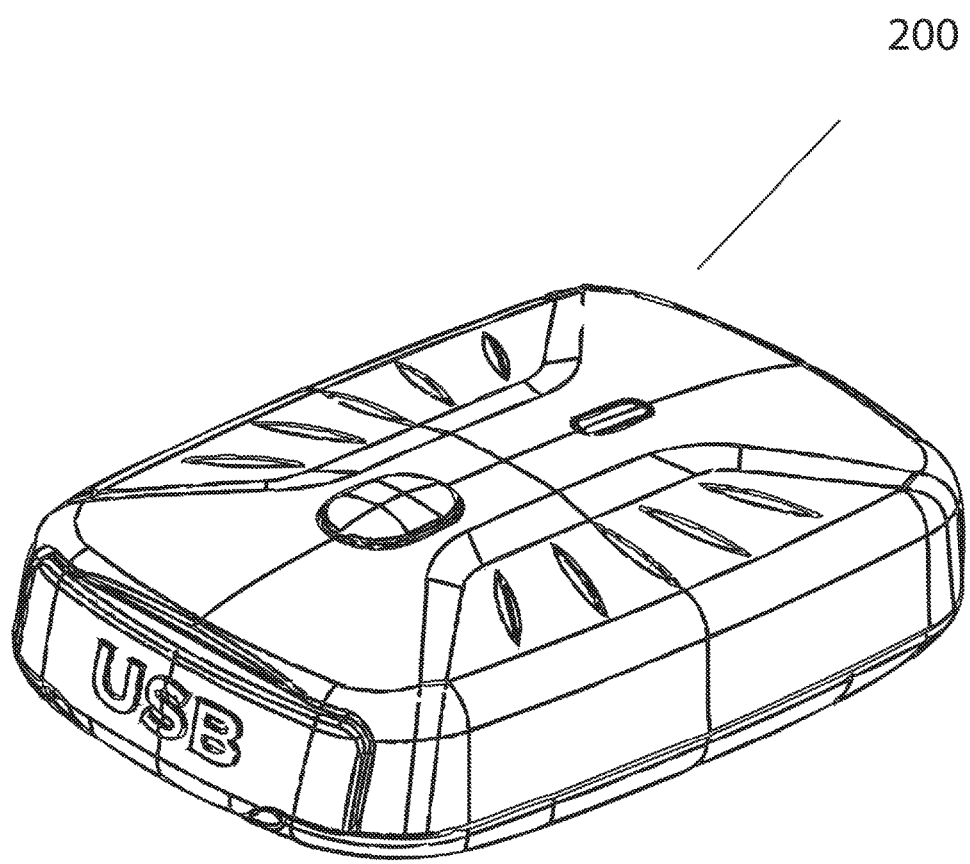
FIG. 36 shows another embodiment of the motion sensor, as an embodiment of the subject matter.

FIG. 36 shows another embodiment of the motion sensor 200. The motion sensor detects the gestures performed by the rider of the bicycle using their head. The gestures may include the head of the rider moving up and down, and the head moving sideways to left or right direction. Based on the movement of the head, the motion sensor 200 generates a signal which may be the used to cause the movement of the rotatable light source and the left indicator light or the right indictor light. The motion sensor 200 may include a USB port for charging and other purposes.

Figure 37:
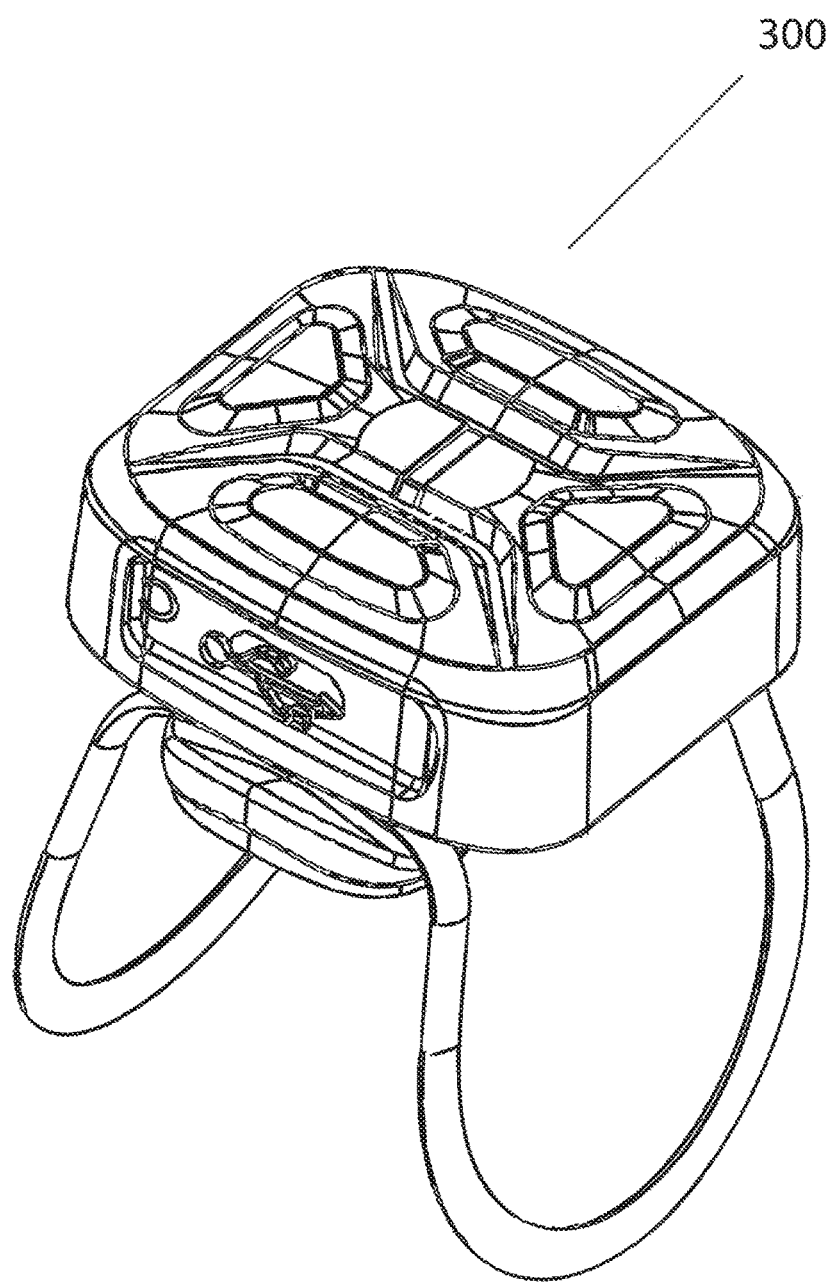
FIG. 37 shows a perspective view of another embodiment of the remote control, as an embodiment of the subject matter.

FIG. 37 shows a perspective view of another embodiment of the remote control 300. The remote control 300 may be used for controlling the operation of the rotatable lighting source 002, and the left indicator light 007a and the right indictor light 007b. The remote control 300 may be used when the motion sensor 200 is not in use. Using the Remote Control 300, the rider can control the lighting stem assembly 001 manually by click or touch.

Figure 38:
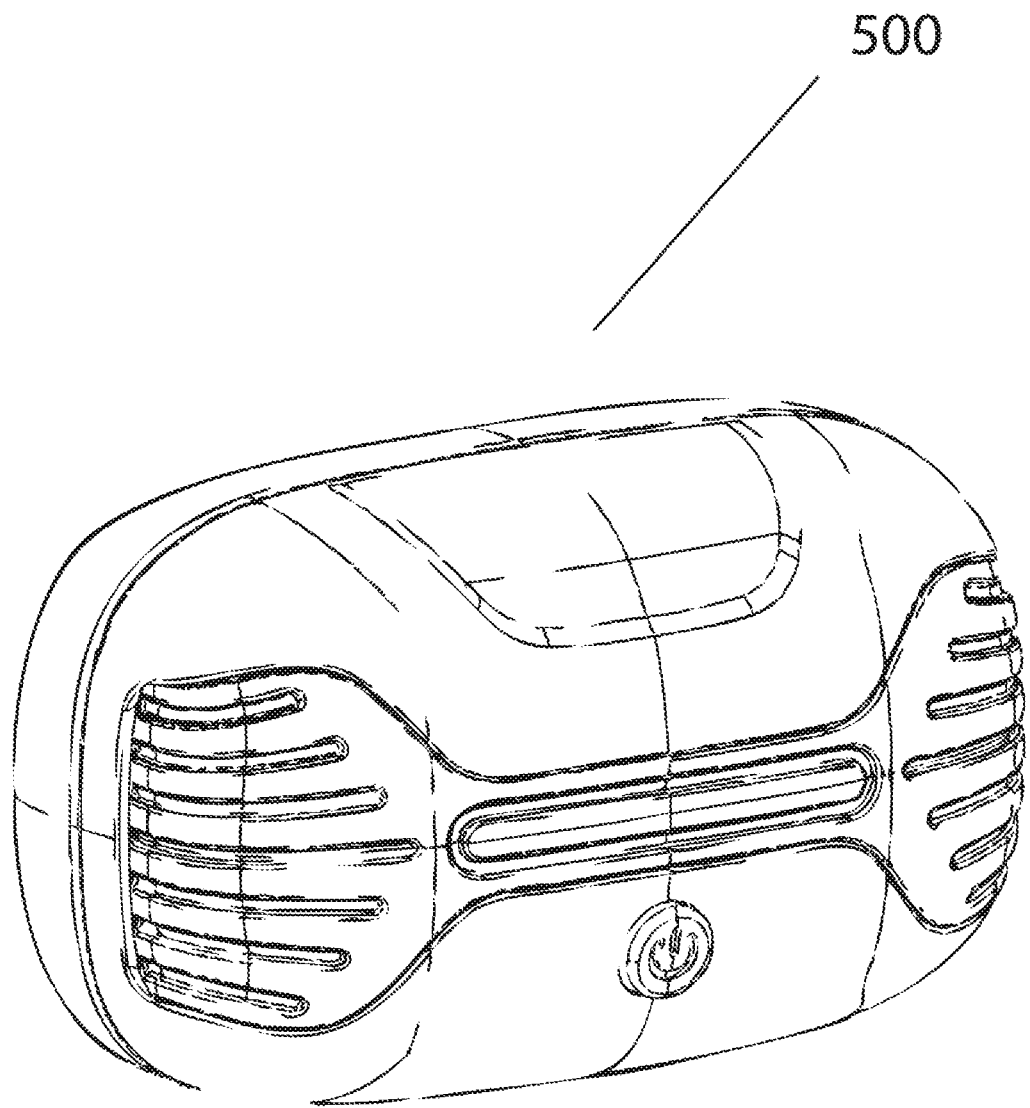
FIG. 38 shows a rear light for the bicycle, as an embodiment of the subject matter.

FIG. 38 shows a rear light 500 for the bicycle 013. The rear light 500 may provide indication of the left or right turning of the bicycle. Further, the rear light 500 may also provide indication about the braking and the deceleration of the bicycle 013.

During turning of the bicycle 013, a left side light or the right-side light of the rear light 500 is illuminated, based on if the bicycle is turning in the left direction or the right direction. Further, during braking or deceleration of the bicycle, both the left side light and the right-side light of the rear light 500 are illuminated. Such an indication further aids in assuring safety of the riders in dark riding conditions.

The bicycle is equipped with braking and motion detection sensors. The braking and the motion detection sensors may detect possible deceleration or stopping of the bicycle 013. Upon detecting the deceleration or stopping of the bicycle 013, the motion and braking detection sensors may then generate signals which are received by the signal receiver 012. The signal is then passed to the light control PCB module 005 which then communicates with the rear light 500 to then activate both the left side light and the right-side light of the rear light 500.

Further, the motion sensor 200 may detect the gesture of head of the rider moving sideways to the left or the right side performed for giving indication of turning of the bicycle 013 towards the left or the right side. Based on the movement of the head detected by the motion sensor 200, the signal generator 011 generates a signal which is received by the signal receiver 012. The signal received by the signal receiver 012 is then passed on the to the light control PCB module 005 which then communicates with the rear light 500 to activate the left side light or the right-side light of the rear light 500.

Figure 39:
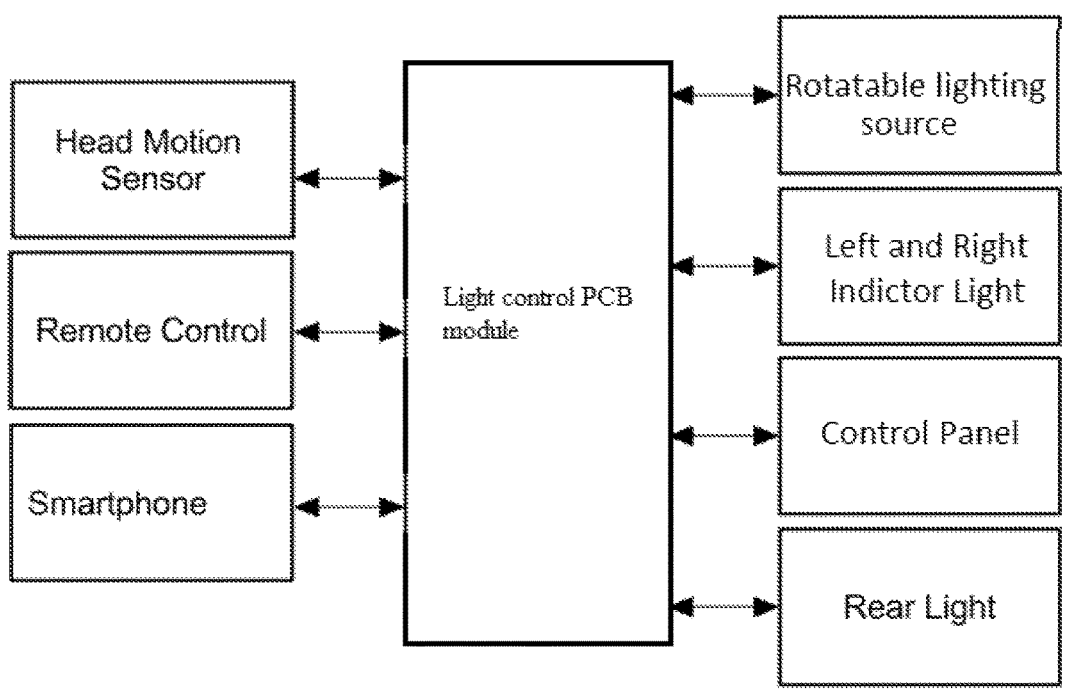
FIG. 39 shows a system diagram of the smart lighting system, as an embodiment of the subject matter.

FIG. 39 shows a system diagram of the smart lighting system. The smart lighting system includes lighting stem assembly 001 which further includes a light control PCB module 005. The light control PCB module 005 is adapted to receive signals from the signal generator 011 and process the received signals. The light control PCB module 005 then passes on the processed signals to control the various lightings of the lighting stem assembly 001, such as the rotatable lighting source 002, the left indicator light 007a and the right indictor 007b, and the rear light 500.

The light control PCB module 005 may include a microprocessor (MCU) for processing the various signals. The microprocessor may be implemented as hardware or software. If such acts are implemented in software, one or more processors of the associated computing system that performs the act direct the operation of the computing system in response to having executed computer-executable instructions. For example, such computer-executable instructions may be embodied on one or more computer-readable media that form a computer program product.

The light control PCB module 005 of the lighting stem assembly 001 is adapted to receive signals from the motion sensor 200 mounted on the helmet 014 of the rider of the bicycle 013. The light control PCB module 005 of the lighting stem assembly 001 is also adapted to receive signals from the remote control 300. Further, the light control PCB module 005 of the lighting stem assembly 001 is also adapted to receive signals from a Smartphone.

The light control PCB module 005 communicates with the various lightings of the lighting stem assembly 001, such as the rotatable lighting source 002, the left indicator light 007a and the right indictor 007b, and the rear light 500 to control the operation of the same based on the signals received from the motion sensor 200, remote control 300, Smartphone, motion and braking sensors.

The light control PCB module 005 also communicates with the control panel 003 to display various parameters associated with the bicycle, such as including speed, slope, time and battery status. Further, the light control PCB module 005 may also record the various performance parameters of the rider during riding the bicycle. The information obtained can be then shared with other devices for the smart lighting system to work as Internet of Things (IOT) device. The light control PCB module 005 may also communicate with a GPS service provider to provide to the rider GPS relate information.

Figure 40:
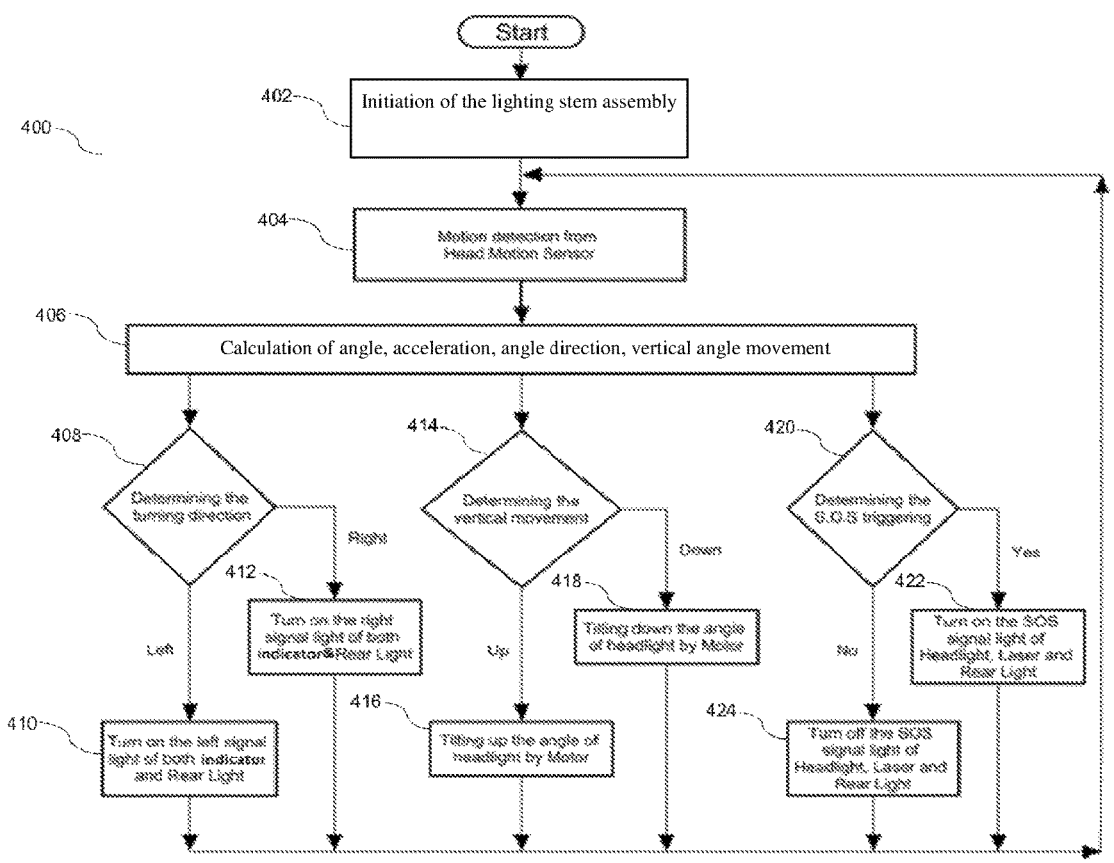
FIG. 40 shows a flowchart of the method of the operation of the smart lighting system, as an embodiment of the subject matter.

FIG. 40 shows a flowchart of the method 400 of the operation of the smart lighting system. As the smart lighting system starts at step 402, the lighting stem assembly 001 is initiated. Thereafter, the light control PCB module 005 receives signal form the motion sensor 200, at step 404, about the gesture performed by the head of the rider of the bicycle. The light control PCB module 005 then processes the signals, at step 406, to calculate the angle, acceleration, angle direction and vertical angle movement of the gesture performed.

Based on the calculated angle, acceleration, direction and vertical angle movement of the gesture, the method 400 proceeds to step 408, where the method 400 involves determining if the rider intending to turn the bicycle to the left side or the right side. If the rider intention of turning to left is determined, the light control PCB module 005 then causes turning ON of the left indicator light 007a and the left light of the rear light 500 at step 410. If the rider intention of turning to right is determined, the light control PCB module 005 then causes turning ON of the right indicator light 007b and the right light of the rear light 500 at step 412.

Based on the calculated angle, acceleration, direction and vertical angle movement of the gesture; the method 400 proceeds to step 414 to determine the vertical movement of the gesture performed by the head of the rider. If the downward movement of the head is detected, the light control PCB module 005 causes rotating of the rotatable lighting source 002 in the downward direction at step 418. If the upward movement of the head is detected, the light control PCB module 005 causes rotating of the rotatable lighting source 002 in the upward direction at step 416.

Based on the calculated angle, acceleration, direction and vertical angle movement of the gesture; the method 400 proceeds to step 420 to determine SOS triggering. If the SOS triggering is detected, then the light control PCB module 005 causes the turning ON of the headlight (rotatable lighting source 002), both the left indicator light 007a and the right indictor 007b, and the rear light at step 422. If no SOS triggering is detected, no action is taken at step 424.

Figure 41:
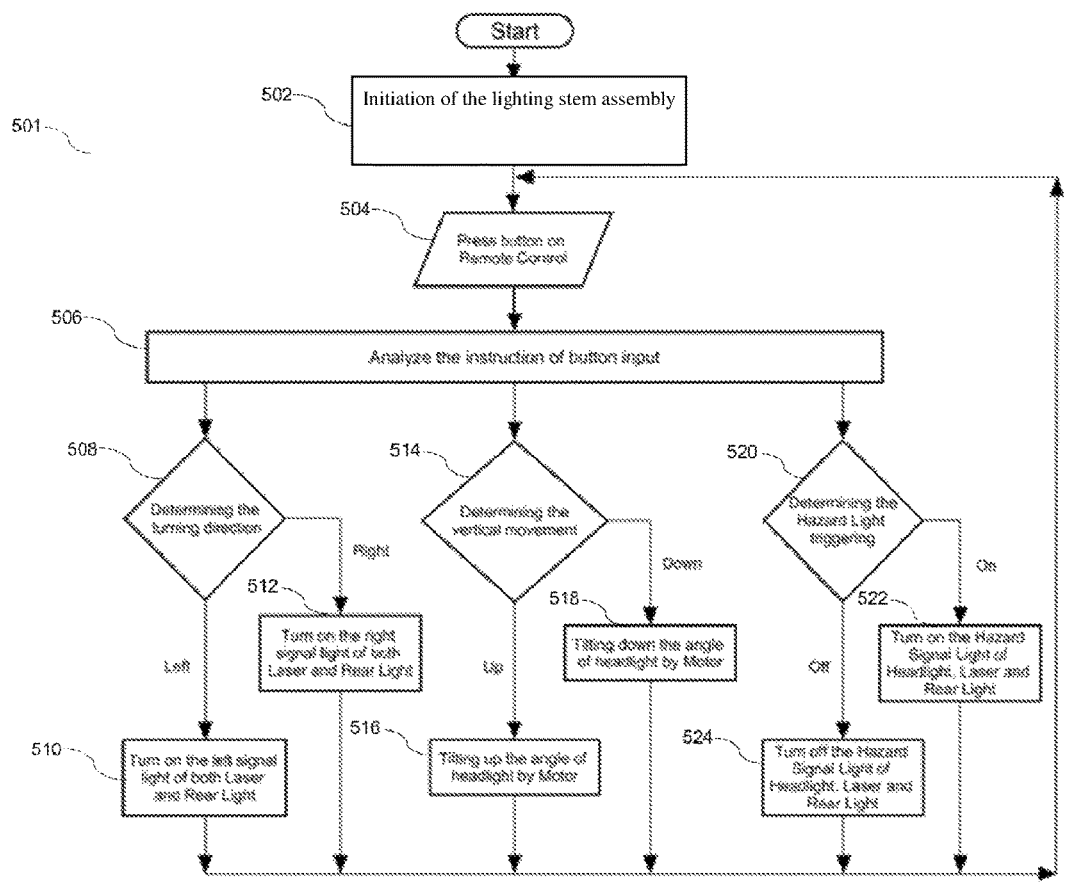
FIG. 41 shows a flowchart of another method of the operation of the smart lighting system, as an embodiment of the subject matter.

FIG. 41 shows a flowchart of another method 501 of the operation of the smart lighting system. As the smart lighting system starts, at step 502, wherein the lighting stem assembly 001 is initiated. Thereafter at step 504, the light control PCB module 005 receives signal from the remote control 300. The light control PCB module 005 then processes the signals, at step 506, to analyze the instructions received by the use of the various buttons of the remote control 300.

Based on the calculated angle, acceleration, direction and vertical angle movement of the gesture; the method 501 proceeds to step 508, where the method 501 involves determining if the rider intending to turn the bicycle to the left side or the right side. If the rider intention of turning to left is determined, the light control PCB module 005 then causes turning ON of the left indicator light 007a and the left light of the rear light 500 at step 510. If the rider intention of turning to right is determined, the light control PCB module 005 then causes turning ON of the right indicator light 007b and the right light of the rear light 500 at step 512.

Based on the calculated angle, acceleration, direction and vertical angle movement of the gesture; the method 501 proceeds to step 514 to determine the vertical movement of the gesture performed by the head of the rider. If the downward movement of the head is detected, the light control PCB module 005 causes rotating of the rotatable lighting source 002 in the downward direction at step 518. If the upward movement of the head is detected, the light control PCB module 005 causes rotating of the rotatable lighting source 002 in the upward direction at step 516.

Based on the calculated angle, acceleration, direction and vertical angle movement of the gesture; the method 501 proceeds to step 520 to determine SOS triggering. If the SOS triggering is detected, then the light control PCB module 005 causes the turning ON of the headlight (rotatable lighting source 002), both the left indicator light 007a and the right indictor 007b, and the rear light at step 522. If no SOS triggering is detected, no action is taken at step 524.

Figure 42:
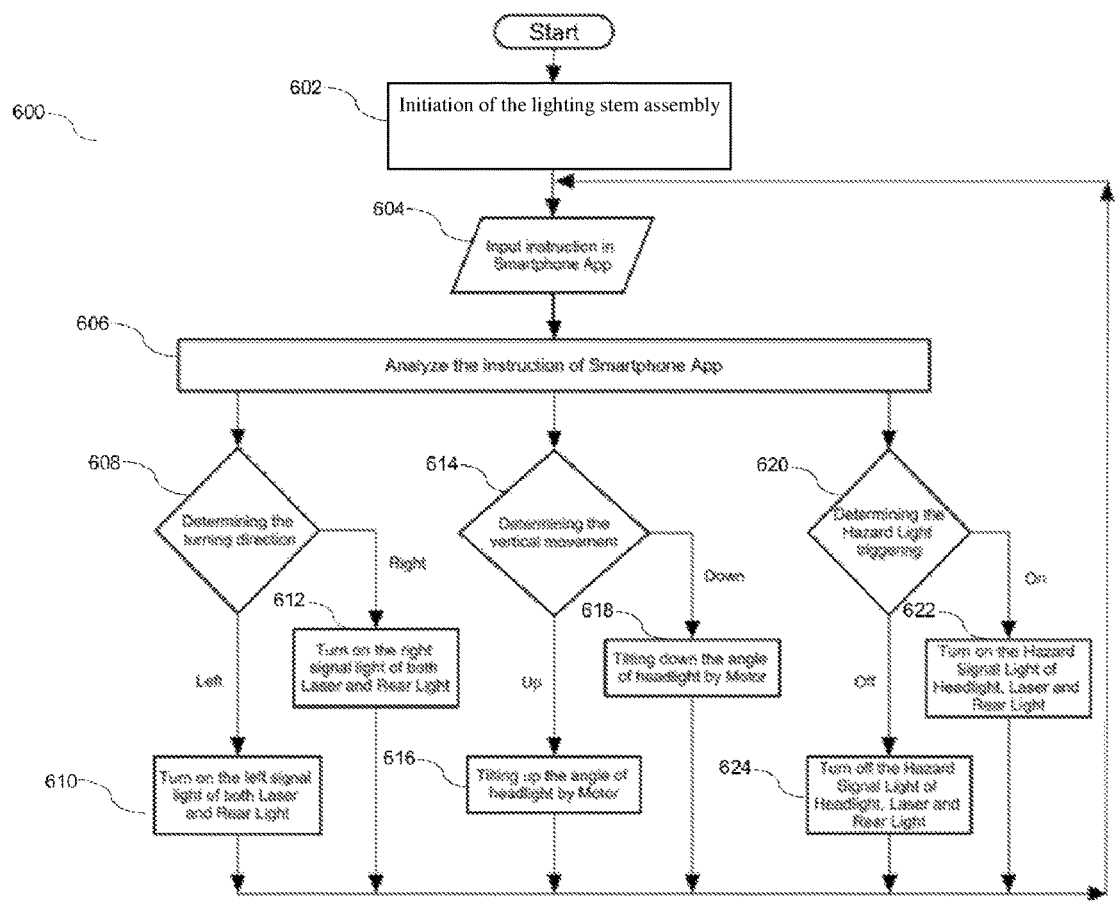
FIG. 42 shows a flowchart of another method of the operation of the smart lighting system using Smartphone, as an embodiment of the subject matter.

FIG. 42 shows a flowchart of another method 600 of the operation of the smart lighting system using Smartphone. As the smart lighting system starts at step 602, the lighting stem assembly 001 is initiated. Thereafter at step 604, the light control PCB module 005 receives signal from the Smartphone. The light control PCB module 005 then processes the signals, at step 606, to analyze the instruction received by the use of the Smartphone.

Based on the calculated angle, acceleration, direction and vertical angle movement of the gesture; the method 600 proceeds to step 608, where the method 600 involves determining if the rider intending to turn the bicycle to the left side or the right side. If the rider intention of turning to left is determined, the light control PCB module 005 then causes turning ON of the left indicator light 007a and the left light of the rear light 500 at step 610. If the rider intention of turning to right is determined, the light control PCB module 005 then causes turning ON of the right indicator light 007b and the right light of the rear light 500 at step 612.

Based on the calculated angle, acceleration, direction and vertical angle movement of the gesture; the method 600 proceeds to step 614 to determine the vertical movement of the gesture performed by the head of the rider. If the downward movement of the head is detected, the light control PCB module 005 causes rotating of the rotatable lighting source 002 in the downward direction at step 618. If the upward movement of the head is detected, the light control PCB module 005 causes rotating of the rotatable lighting source 002 in the upward direction at step 616.

Based on the calculated angle, acceleration, direction and vertical angle movement of the gesture; the method 600 proceeds to step 620 to determine SOS triggering. If the SOS triggering is detected, then the light control PCB module 005 causes the turning ON of the headlight (rotatable lighting source 002), both the left indicator light 007a and the right indictor 007b, and the rear light at step 622. If no SOS triggering is detected, no action is taken at step 624.

Figure 43:
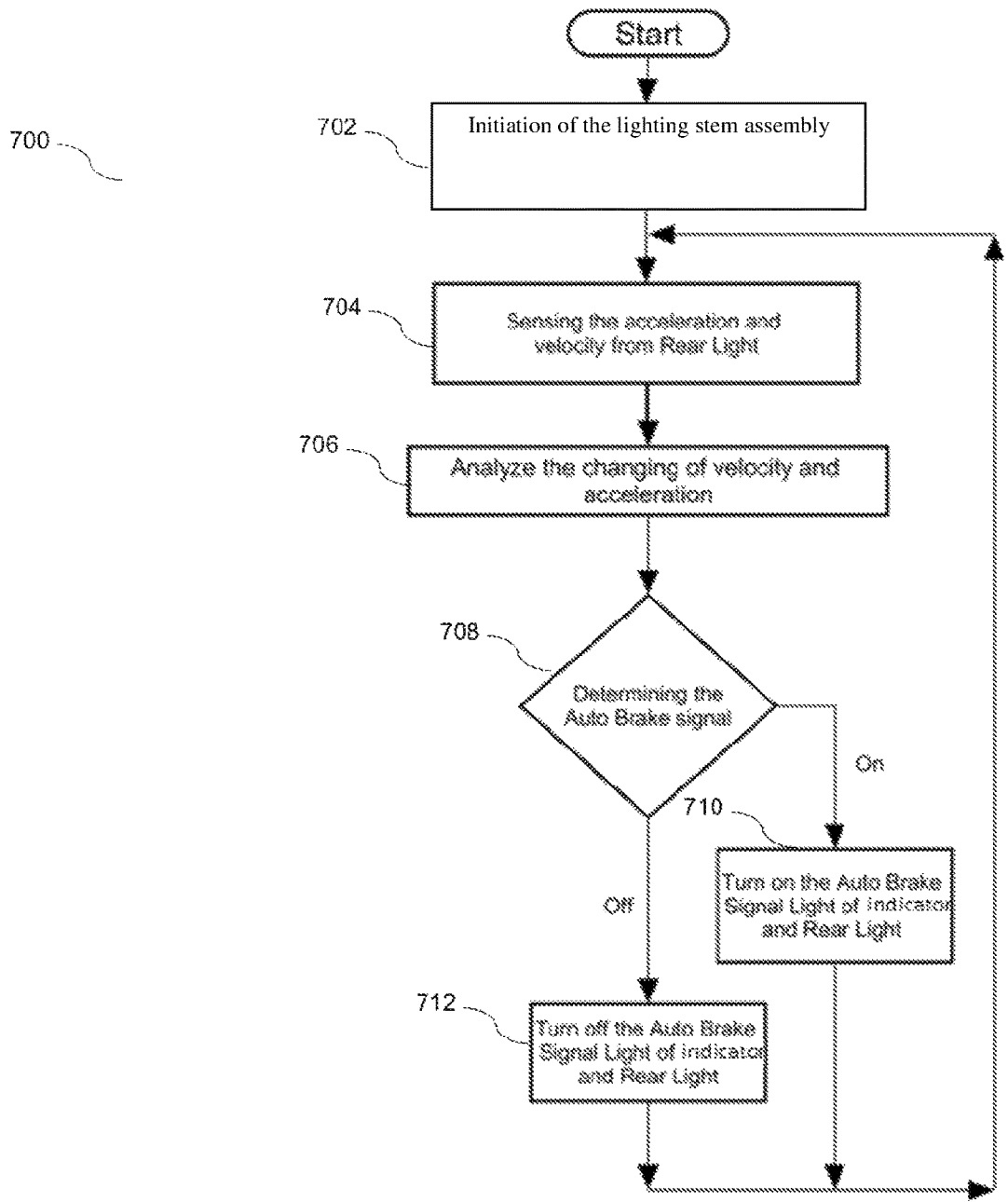
FIG. 43 shows a flowchart of another method of the operation of the smart lighting system based on sensing of the acceleration and speed by the motion and braking sensors, as an embodiment of the subject matter.

FIG. 43 shows a flowchart of another method 700 of the operation of the smart lighting system based on sensing of the acceleration and speed by the motion and braking sensors. As the smart lighting system starts at step 702, the lighting stem assembly 001 is initiated. Thereafter, the light control PCB module 005 receives signal from the motion and braking sensors at step 704. The light control PCB module 005 then processes the signals, at step 706, to analyze the change in the velocity and acceleration of the bicycle. Based on the analysis, it is determined, at step 708, if there is any auto braking signal. If the auto braking signal is detected, the light control PCB module 005 then causes turning ON of the brake signal light (both left side light and right-side light of the rear light 500), as well as both the left indicator light 007a and the right indictor 007b at step 710. In case, there is no auto braking signal determined, then the auto braking signal is turned OFF at step 712.

The applications described above are some examples of a wide range of applications applicable by the smart lighting system of the present patent application in vehicles, and relate to providing improved lighting solutions. The described smart lighting system can be designed and built in other forms and be utilized, including but not limiting to the present disclosed applications, in other industrial and commercial areas.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described above, the method may be considered to be implemented in the above described system and/or the apparatus and/or any electronic device (not shown).

The above description does not provide specific details of manufacture or design of the various components. Those of skilled in the art are familiar with such details, and unless departures from those techniques are set out, techniques, known, related art or later developed designs and materials should be employed. Those in the art are capable of choosing suitable manufacturing and design details.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A smart lighting system for a vehicle, the smart lighting system comprising:
    at least one signal generator; and
    a lighting stem assembly comprising:
        a signal receiver;
        a light control PCB module;
        a rotatable lighting source; and
        at least one light source,
            wherein the signal receiver receives a signal generated by the at least one signal generator, wherein in response to the signal received by the signal receiver, the light control PCB module controls the at least one light source and changes an orientation of the rotatable lighting source.

2. The smart lighting system as claimed in claim 1, wherein the lighting stem assembly is mounted on a two-wheeled vehicle, wherein the two-wheeled vehicle is a bicycle.

3. The smart lighting system as claimed in claim 1, wherein the at least one signal generator is a motion sensor, wherein the motion sensor is mounted on a helmet of a rider of the vehicle.

4. The smart lighting system as claimed in claim 3, wherein the motion sensor has a curved shape.

5. The smart lighting system as claimed in claim 1, wherein the at least one signal generator is a remote control device.

6. The smart lighting system as claimed in claim 1, wherein the at least one signal generator is a smart phone.

7. The smart lighting system as claimed in claim 1, wherein the rotatable lighting source is fitted inside the lighting stem assembly and is removable from the lighting stem assembly.

8. The smart lighting system as claimed in claim 1, wherein the lighting stem assembly further comprises:
    a left indicator light and a right indicator light, wherein
        each of the left indicator light and the right indicator light is adapted to project light on the ground,
            wherein the light control PCB module causes each of the left indicator light and the right indicator light to project the light on the ground in response to the signal received by the signal receiver.

9. The smart lighting system as claimed in claim 8, wherein the lighting stem assembly further comprises:

a display screen configured to display information about one of parameters including speed, slope, time, and battery status.

10. The smart lighting system as claimed in claim 9, wherein the lighting stem assembly further comprises:
a power socket for supplying electricity for charging various electrical devices.

11. The smart lighting system as claimed in claim 10, wherein the lighting stem assembly further comprises a battery, wherein the battery is configured to supply electricity at least to the rotatable light source, the left indicator light and the right indicator light, and the power socket.

12. The smart lighting system as claimed in claim 1, further comprising a motion and braking sensor to detect speed, acceleration and deceleration of the vehicle.

13. A smart lighting control method comprising:
receiving signal, by a light control PCB module, from at least one signal generator;
in response to the signal received, controlling, by the light control PCB module, at least one of a left indicator light, and a right indicator light; and
in response to the signal received, changing, by the light control PCB module, an orientation of a rotatable lighting source.

14. The method as claimed in claim 13, wherein the at least one signal generator is a motion sensor mounted on a helmet of a rider of a vehicle.

15. The method as claimed in claim 14, wherein the motion sensor has a curved shape.

16. The method as claimed in claim 13, wherein the at least one signal generator is a remote control device.

17. The method as claimed in claim 13, wherein the at least one signal generator is a Smartphone.

18. The method as claimed in claim 13, wherein controlling the left indicator light and the right indicator light comprises:
in response to the signal received, the light control PCB module causing each of the left indicator light and the right indicator light to project light on the ground.

19. The method as claimed in claim 13, further comprising: displaying on a display screen information about one of parameters including speed, slope, time, battery status.

20. The method as claimed in claim 13, wherein the rotatable light source, the left indicator light and the right indicator light are powered by a battery.

* * * * *